United States Patent
Trivedi et al.

(10) Patent No.: US 11,816,253 B2
(45) Date of Patent: Nov. 14, 2023

(54) ENABLING SECURE COMMUNICATION VIA ATTESTATION OF MULTI-TENANT CONFIGURATION ON ACCELERATOR DEVICES

(71) Applicant: Intel Corporation, Santa Clara, CA (US)

(72) Inventors: Alpa Trivedi, Portland, OR (US); Steffen Schulz, Darmstadt (DE); Patrick Koeberl, Alsbach-Haenlein (DE)

(73) Assignee: INTEL CORPORATION, Santa Clara, CA (US)

( * ) Notice: Subject to any disclaimer, the term of this patent is extended or adjusted under 35 U.S.C. 154(b) by 424 days.

(21) Appl. No.: 17/130,506

(22) Filed: Dec. 22, 2020

(65) Prior Publication Data

US 2021/0110065 A1    Apr. 15, 2021

Related U.S. Application Data

(60) Provisional application No. 63/083,783, filed on Sep. 25, 2020.

(51) Int. Cl.
*G06F 21/85*    (2013.01)
*G06F 30/398*   (2020.01)
(Continued)

(52) U.S. Cl.
CPC .......... *G06F 21/85* (2013.01); *G06F 9/30101* (2013.01); *G06F 9/3877* (2013.01);
(Continued)

(58) Field of Classification Search
CPC .... G06F 21/85; G06F 9/30101; G06F 9/3877; G06F 9/505; G06F 11/0709;
(Continued)

(56) References Cited

U.S. PATENT DOCUMENTS

| | | |
|---|---|---|
| 5,937,159 A | 8/1999 | Meyers et al. |
| 7,343,578 B1 | 3/2008 | Patterson et al. |

(Continued)

FOREIGN PATENT DOCUMENTS

| | | |
|---|---|---|
| CN | 101442436 A | 5/2009 |
| CN | 102986163 A | 3/2013 |

(Continued)

OTHER PUBLICATIONS

Non-Final Office Action, U.S. Appl. No. 17/129,243, dated Jul. 22, 2022, 25 pages, USPTO.

(Continued)

*Primary Examiner* — Maurice L. McDowell, Jr.
(74) *Attorney, Agent, or Firm* — JAFFERY WATSON MENDONSA & HAMILTON LLP

(57) ABSTRACT

An apparatus to facilitate enabling secure communication via attestation of multi-tenant configuration on accelerator devices is disclosed. The apparatus includes a processor to: verify a base bitstream of an accelerator device, the base bitstream published by a cloud service provider (CSP); verify partial reconfiguration (PR) boundary setups and PR isolation of an accelerator device, the PR boundary setups and PR isolation published by the CSP; generate PR bitstream to fit within at least one PR region of the PR boundary setups of the accelerator device; inspect accelerator device attestation received from a secure device manager (SDM) of the accelerator device; and responsive to successful inspection of the accelerator device attestation, provide the PR bitstream to the CSP for PR reconfiguration of the accelerator device.

20 Claims, 17 Drawing Sheets

(51) Int. Cl.

| | |
|---|---|
| *G06N 3/04* | (2023.01) |
| *H04L 9/08* | (2006.01) |
| *G06F 9/30* | (2018.01) |
| *G06F 9/50* | (2006.01) |
| *G06F 15/177* | (2006.01) |
| *G06F 15/78* | (2006.01) |
| *H04L 9/40* | (2022.01) |
| *G06F 11/07* | (2006.01) |
| *G06F 30/331* | (2020.01) |
| *G06F 9/38* | (2018.01) |
| *G06F 11/30* | (2006.01) |
| *G06F 119/12* | (2020.01) |
| *G06F 21/76* | (2013.01) |
| *G06N 3/08* | (2023.01) |
| *H04L 9/00* | (2022.01) |
| *G06F 111/04* | (2020.01) |
| *G06F 30/31* | (2020.01) |
| *G06F 21/30* | (2013.01) |
| *G06F 21/53* | (2013.01) |
| *G06F 21/57* | (2013.01) |
| *G06F 21/73* | (2013.01) |
| *G06F 21/74* | (2013.01) |
| *G06N 20/00* | (2019.01) |
| *G06F 21/71* | (2013.01) |
| *G06F 21/44* | (2013.01) |

(52) U.S. Cl.
CPC .......... *G06F 9/505* (2013.01); *G06F 11/0709* (2013.01); *G06F 11/0751* (2013.01); *G06F 11/0754* (2013.01); *G06F 11/0793* (2013.01); *G06F 11/3058* (2013.01); *G06F 15/177* (2013.01); *G06F 15/7825* (2013.01); *G06F 15/7867* (2013.01); *G06F 30/331* (2020.01); *G06F 30/398* (2020.01); *G06N 3/04* (2013.01); *H04L 9/0877* (2013.01); *H04L 63/0442* (2013.01); *H04L 63/12* (2013.01); *H04L 63/20* (2013.01); *G06F 11/0772* (2013.01); *G06F 11/3051* (2013.01); *G06F 21/30* (2013.01); *G06F 21/44* (2013.01); *G06F 21/53* (2013.01); *G06F 21/57* (2013.01); *G06F 21/575* (2013.01); *G06F 21/71* (2013.01); *G06F 21/73* (2013.01); *G06F 21/74* (2013.01); *G06F 21/76* (2013.01); *G06F 30/31* (2020.01); *G06F 2111/04* (2020.01); *G06F 2119/12* (2020.01); *G06F 2221/034* (2013.01); *G06N 3/08* (2013.01); *G06N 20/00* (2019.01); *H04L 9/008* (2013.01); *H04L 9/0841* (2013.01)

(58) Field of Classification Search
CPC ............. G06F 11/0751; G06F 11/0754; G06F 11/0793; G06F 11/3058; G06F 15/177; G06F 15/7825; G06F 15/7867; G06F 30/331; G06F 30/398; G06F 11/0772; G06F 11/3051; G06F 21/30; G06F 21/44; G06F 21/53; G06F 21/57; G06F 21/575; G06F 21/71; G06F 21/73; G06F 21/74; G06F 21/76; G06F 30/31; G06F 2111/04; G06F 2119/12; G06F 2221/034; G06F 2209/509; G06F 9/5027; G06F 15/7875; G06F 21/577; G06N 3/04; G06N 3/08; G06N 20/00; G06N 3/063; H04L 9/0877; H04L 63/0442; H04L 63/12; H04L 63/20; H04L 9/008; H04L 9/0841; H04L 9/0825; H04L 9/0833; H04L 63/065; H04L 63/0853; H04L 9/0894
See application file for complete search history.

(56) References Cited

U.S. PATENT DOCUMENTS

| | | |
|---|---|---|
| 7,406,673 B1 | 7/2008 | Patterson et al. |
| 7,663,401 B1 | 2/2010 | Nguyen et al. |
| 7,673,332 B2 | 3/2010 | Mardikar et al. |
| 7,797,651 B1 * | 9/2010 | Jacobson .............. G06F 30/398 326/38 |
| 8,176,336 B1 | 5/2012 | Mao et al. |
| 8,327,200 B1 | 12/2012 | Mohan |
| 8,964,974 B2 | 2/2015 | Holmdahl |
| 9,021,163 B1 | 4/2015 | Czarny et al. |
| 9,230,129 B1 | 1/2016 | Mao et al. |
| 9,306,741 B1 | 4/2016 | Brainard |
| 9,401,766 B2 | 7/2016 | Yuan et al. |
| 9,584,130 B1 * | 2/2017 | Weber .............. H03K 19/17736 |
| 9,603,012 B2 | 3/2017 | Kruglick |
| 9,613,523 B2 | 4/2017 | Davidson et al. |
| 9,660,801 B2 | 5/2017 | Parann-Nissany |
| 9,664,531 B2 | 5/2017 | Buhan et al. |
| 9,729,312 B2 | 8/2017 | Bathen |
| 9,800,517 B1 | 10/2017 | Anderson |
| 10,050,959 B2 | 8/2018 | Soon-Shiong et al. |
| 10,101,387 B1 | 10/2018 | Iyer et al. |
| 10,116,437 B1 | 10/2018 | Krendelev |
| 10,152,566 B1 | 12/2018 | Nagarandal et al. |
| 10,289,816 B1 | 5/2019 | Malassenet et al. |
| 10,621,299 B1 * | 4/2020 | Yu ........................... G06F 30/31 |
| 10,644,876 B2 | 5/2020 | Williams et al. |
| 10,673,439 B1 | 6/2020 | Ahmad et al. |
| 10,764,048 B2 | 9/2020 | Joye et al. |
| 10,795,742 B1 | 10/2020 | Khan et al. |
| 10,817,262 B2 | 10/2020 | Carr et al. |
| 10,866,279 B2 | 12/2020 | Panesar |
| 11,003,681 B2 | 5/2021 | Koike et al. |
| 11,177,935 B2 | 11/2021 | Musuvathi et al. |
| 11,196,541 B2 | 12/2021 | Williams et al. |
| 11,218,368 B2 | 1/2022 | Zou |
| 11,321,382 B2 | 5/2022 | Pankanti et al. |
| 11,328,111 B2 | 5/2022 | Schulz et al. |
| 11,411,738 B2 | 8/2022 | Agrawal et al. |
| 11,509,454 B2 | 11/2022 | Cheon |
| 11,556,677 B2 | 1/2023 | Turan et al. |
| 11,651,111 B2 | 5/2023 | Trivedi et al. |
| 11,651,112 B2 | 5/2023 | Trivedi et al. |
| 2009/0013406 A1 | 1/2009 | Cabuk et al. |
| 2010/0106967 A1 | 4/2010 | Johansson et al. |
| 2010/0228926 A1 | 9/2010 | Maheshwari |
| 2012/0216244 A1 | 8/2012 | Kumar et al. |
| 2013/0061293 A1 | 3/2013 | Mao |
| 2014/0109029 A1 | 4/2014 | Bai et al. |
| 2014/0258736 A1 | 9/2014 | Merchan et al. |
| 2015/0319160 A1 | 11/2015 | Ferguson et al. |
| 2016/0323143 A1 * | 11/2016 | Kim ..................... G06F 3/0629 |
| 2017/0103217 A1 | 4/2017 | Arasu et al. |
| 2017/0200225 A1 | 7/2017 | Kanungo |
| 2017/0220499 A1 | 8/2017 | Gray |
| 2017/0272077 A1 | 9/2017 | Sharma et al. |
| 2018/0139110 A1 | 5/2018 | Johnson et al. |
| 2018/0218363 A1 | 8/2018 | Acar et al. |
| 2018/0239665 A1 | 8/2018 | Hutton et al. |
| 2018/0367147 A1 | 12/2018 | Khor et al. |
| 2019/0028104 A1 | 1/2019 | Wang et al. |
| 2019/0042466 A1 | 2/2019 | Khosravi et al. |
| 2019/0042533 A1 | 2/2019 | Custodio |
| 2019/0050604 A1 | 2/2019 | Weber et al. |
| 2019/0065757 A1 | 2/2019 | Graf et al. |
| 2019/0087575 A1 | 3/2019 | Sahita et al. |
| 2019/0087606 A1 * | 3/2019 | Subhaschandra ....... G06F 21/31 |
| 2019/0095910 A1 | 3/2019 | Gumowski |
| 2019/0103976 A1 | 4/2019 | Chhabra et al. |
| 2019/0108113 A1 | 4/2019 | Crawford et al. |
| 2019/0188419 A1 * | 6/2019 | Trimberger ............. G06F 30/34 |
| 2019/0199692 A1 | 6/2019 | Atta et al. |
| 2019/0228145 A1 | 7/2019 | Shanbhogue et al. |
| 2019/0253402 A1 | 8/2019 | Kärkkäinen et al. |
| 2019/0258953 A1 | 8/2019 | Lang et al. |
| 2019/0306134 A1 | 10/2019 | Shanbhogue et al. |

(56) References Cited

U.S. PATENT DOCUMENTS

| | | |
|---|---|---|
| 2019/0311123 A1 | 10/2019 | Lal et al. |
| 2020/0026575 A1 | 1/2020 | Guim Bernat et al. |
| 2020/0036510 A1 | 1/2020 | Gomez et al. |
| 2020/0099582 A1 | 3/2020 | Zou |
| 2020/0151362 A1 | 5/2020 | Harriman et al. |
| 2020/0162404 A1* | 5/2020 | Sardaryan ............... H04L 49/15 |
| 2020/0233982 A1* | 7/2020 | Long .............. G01R 31/318533 |
| 2020/0350321 A1 | 11/2020 | Cheng et al. |
| 2021/0042252 A1* | 2/2021 | Thyamagondlu ....... G06F 30/34 |
| 2021/0064546 A1 | 3/2021 | Zmudzinski et al. |
| 2021/0064975 A1 | 3/2021 | Purandare et al. |
| 2021/0109889 A1 | 4/2021 | Schulz et al. |
| 2021/0110069 A1 | 4/2021 | Trivedi et al. |
| 2021/0110099 A1 | 4/2021 | Turan et al. |
| 2021/0111863 A1 | 4/2021 | Trivedi et al. |
| 2021/0112073 A1 | 4/2021 | Schulz et al. |
| 2021/0117268 A1 | 4/2021 | Koeberl et al. |
| 2021/0119632 A1 | 4/2021 | Zhu et al. |
| 2021/0124711 A1 | 4/2021 | Ansari et al. |
| 2021/0150033 A1 | 5/2021 | Trivedi et al. |
| 2021/0182464 A1 | 6/2021 | Miyagaki |
| 2021/0211291 A1 | 7/2021 | Jindal et al. |
| 2021/0271963 A1 | 9/2021 | Amisano et al. |
| 2021/0306136 A1 | 9/2021 | Medalion et al. |
| 2021/0320661 A1 | 10/2021 | Weber et al. |
| 2021/0328764 A1 | 10/2021 | Kim et al. |
| 2022/0046200 A1 | 2/2022 | Luo |
| 2022/0171648 A1 | 6/2022 | Rodriguez et al. |

FOREIGN PATENT DOCUMENTS

| | | |
|---|---|---|
| CN | 105373493 A | 3/2016 |
| CN | 111143890 A | 5/2020 |

OTHER PUBLICATIONS

Non-Final Office Action, U.S. Appl. No. 17/129,250, dated Jul. 5, 2022, 13 pages, USPTO.

Non-Final Office Action, U.S. Appl. No. 17/132,221, dated Aug. 3, 2022, 31 pages, USPTO.

Notice of Allowance, U.S. Appl. No. 17/129,254, dated Jul. 14, 2022, 5 pages, USPTO.

Notice of Allowance, U.S. Appl. No. 17/129,254, dated Sep. 2, 2022, 12 pages, USPTO.

Notice of Allowance, U.S. Appl. No. 17/132,306, dated Sep. 7, 2022, 21 pages, USPTO.

Final Office Action, U.S. Appl. No. 17/129,243, dated Feb. 10, 2023, 9 pages, USPTO.

Final Office Action, U.S. Appl. No. 17/132,221, dated Feb. 8, 2023, 20 pages, USPTO.

Notice of Allowance, U.S. Appl. No. 17/129,250, dated Jan. 19, 2022, 9 pages, USPTO.

Notice of Allowance, U.S. Appl. No. 17/712,350, dated Jan. 19, 2023, 15 pages, USPTO.

Smith, Farouk, "Single Event Upset Mitigation by Means of a Sequential Circuit State Freeze"—Microelectronics Reliability, vol. 52, Issue 6, Jun. 2012 (Year: 2012).

Smith, Michael "Partial Reconfiguration of Xilinx FPGA's" Doulos, Apr. 2010 (Year: 2010).

U.S. Appl. No. 17/130,407, "Notice of Allowance" dated Feb. 17, 2022, 20 pages.

Non-Final Office Action, U.S. Appl. No. 18/070,655, dated May 25, 2023, 11 pages, USPTO.

U.S. Appl. No. 17/129,254 "Non-Final Office Action" dated Apr. 4, 2022, 3 pages.

U.S. Appl. No. 17/132,306, "Final Office Action" dated Apr. 11, 2022, 11 pages.

Wikipedia, "Trusted Computing Base", Retrieved using Way Back Machine dated Jul. 10, 2019 (Year: 2019).

U.S. Appl. No. 17/132,306 Non-Final Office Action dated Oct. 28, 2021, 8 pages.

U.S. Appl. No. 17/129,223 Notice of Allowance dated Jan. 20, 2022, 20 pages.

U.S. Appl. No. 17/129,243, "Notice of Allowance" dated May 5, 2023, 5 pages.

U.S. Appl. No. 17/708,412 "Non-Final Office Action" dated Apr. 12, 2023, 11 pages.

Notice of Allowance, U.S. Appl. No. 18/049,781, dated Aug. 17, 2023, 5 pages, USPTO.

* cited by examiner

1700

Verify a base bitstream of an accelerator device, the base bitstream published by a cloud service provider (CSP)
1710

Verify partial reconfiguration (PR) boundary setups and PR isolation of an accelerator device, the PR boundary setups and PR isolation published by the CSP
1720

Generate PR bitstream to fit within at least one PR region of the PR boundary setups of the accelerator device
1730

Inspect accelerator device attestation received from a secure device manager (SDM) of the accelerator device
1740

Responsive to successful inspection of the accelerator device attestation, provide the PR bitstream to the CSP for PR reconfiguration of the accelerator device
1750

*FIG. 17*

ENABLING SECURE COMMUNICATION VIA ATTESTATION OF MULTI-TENANT CONFIGURATION ON ACCELERATOR DEVICES

RELATED APPLICATIONS

This application claims the benefit of priority from U.S. Provisional Patent Application Ser. No. 63/083,783 filed on Sep. 25, 2020, the full disclosure of which is incorporated herein by reference.

FIELD

This disclosure relates generally to data processing and more particularly to enabling secure communication via attestation of multi-tenant configuration on accelerator devices.

BACKGROUND OF THE DISCLOSURE

A programmable logic device can be configured to support a multi-tenant usage model. A multi-tenant usage model arises where a single device is provisioned by a server to support N clients. It is assumed that the clients do not trust each other, that the clients do not trust the server, and that the server does not trust the clients. The multi-tenant model is configured using a base configuration followed by an arbitrary number of partial reconfigurations (i.e., a process that changes only a subset of configuration bits while the rest of the device continues to execute). The server is typically managed by some trusted party such as a cloud service provider.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope.

FIG. 17 is a flow diagram illustrating a method for enabling secure communication via attestation of multi-tenant configuration on accelerator devices, in accordance with implementations of the disclosure.

DETAILED DESCRIPTION

Figure 1:
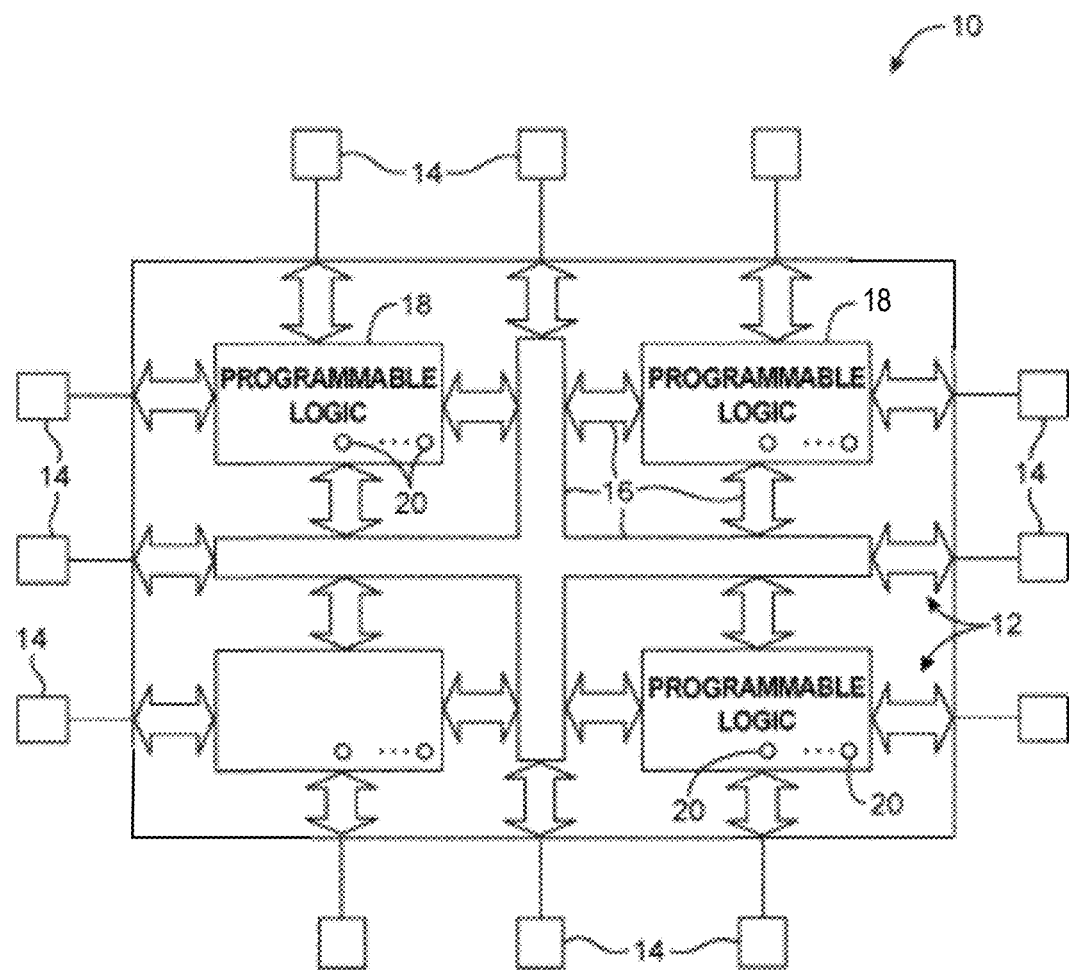
FIG. 1 is a diagram of an illustrative programmable integrated circuit in accordance with an embodiment.

Implementations of the disclosure are directed to enabling secure communication via attestation of multi-tenant configuration on accelerator devices. Disaggregated computing is on the rise in data centers. Cloud service providers (CSP) are deploying solutions where processing of a workload is distributed on disaggregated compute resources such as CPUs and hardware accelerators, such as FPGAs, that are connected via network instead of being on the same platform and connected via physical links such as PCIe. The compute disaggregation enables improved resource utilization and lowers Total Cost of Ownership (TCO) by making more efficient use of available resources. Disaggregation also enables pooling a large number of hardware accelerators for large computation making the computation more efficient and performant. The term "whitelist" is used in this disclosure only for their technical meaning. The term "whitelist" may be substituted with the term "allowlist".

In the following description, numerous specific details are set forth to provide a more thorough understanding. However, it may be apparent to one of skill in the art that the embodiments described herein may be practiced without one or more of these specific details. In other instances, well-known features have not been described to avoid obscuring the details of the present embodiments.

Various embodiments are directed to techniques for disaggregated computing for programmable integrated circuits, for instance.

System Overview

While the concepts of the present disclosure are susceptible to various modifications and alternative forms, specific embodiments thereof have been shown by way of example in the drawings and are described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Programmable integrated circuits use programmable memory elements to store configuration data. During programming of a programmable integrated circuit, configuration data is loaded into the memory elements. The memory elements may be organized in arrays having numerous rows and columns. For example, memory array circuitry may be formed in hundreds or thousands of rows and columns on a programmable logic device integrated circuit.

During normal operation of the programmable integrated circuit, each memory element is configured to provide a static output signal. The static output signals that are supplied by the memory elements serve as control signals. These control signals are applied to programmable logic on the integrated circuit to customize the programmable logic to perform a desired logic function.

It may sometimes be desirable to reconfigure only a portion of the memory elements during normal operation. This type of reconfiguration in which only a subset of memory elements are being loaded with new configuration data during runtime is sometimes referred to as "partial reconfiguration". During partial reconfiguration, new data should be written into a selected portion of memory elements (sometimes referred to as "memory cells").

An illustrative programmable integrated circuit such as programmable logic device (PLD) 10 is shown in FIG. 1. As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Examples of programmable logic device 10 include, but is not limited to, programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few. System configurations in which device 10 is a programmable logic device such as an FPGA is sometimes described as an example but is not intended to limit the scope of the present embodiments.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element can be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
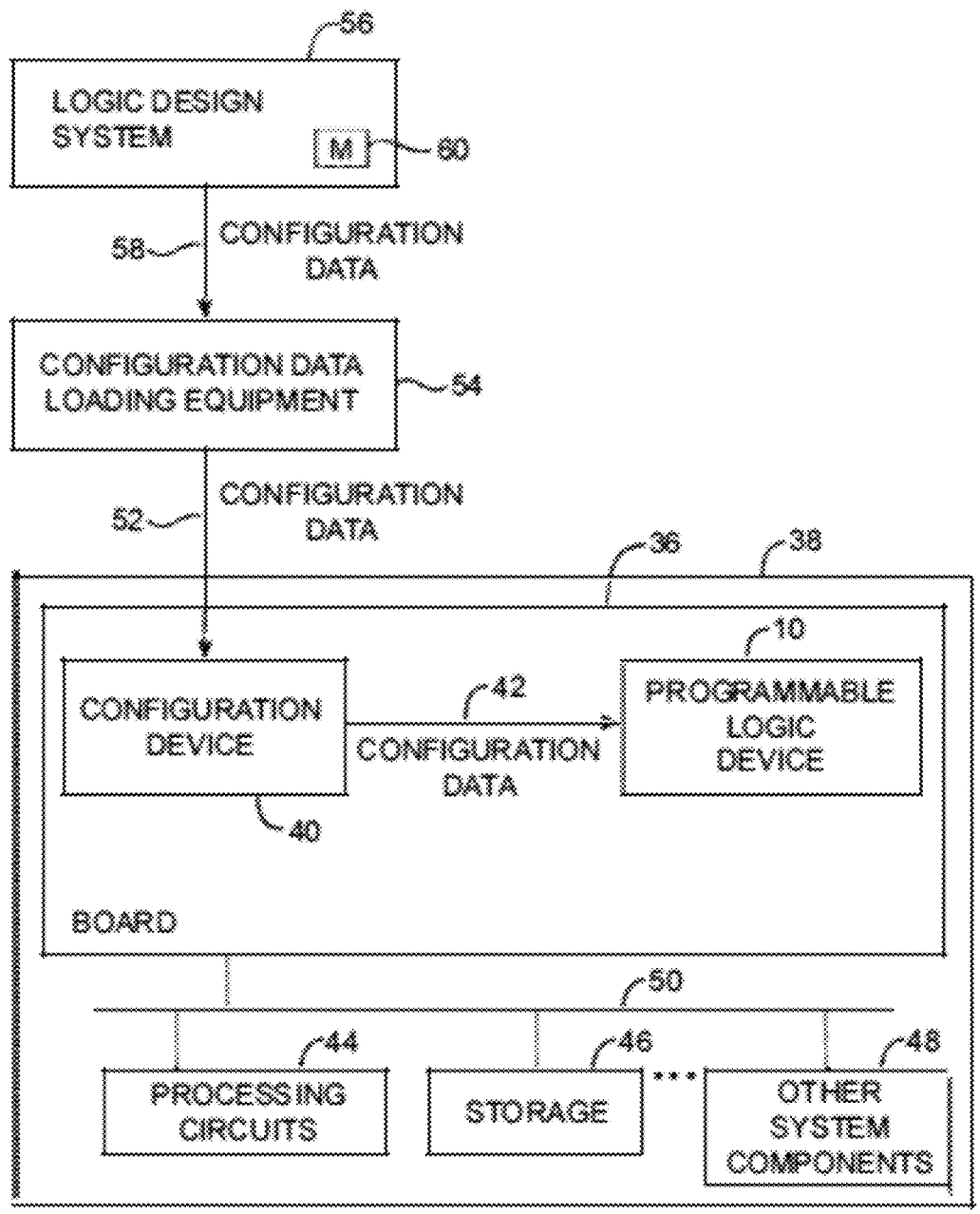
FIG. 2 is a diagram showing how configuration data is created by a logic design system and loaded into a programmable device to configure the device for operation in a system in accordance with an embodiment.

An illustrative system environment for device 10 is shown in FIG. 2. Device 10 may be mounted on a board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10.

Circuit 40 may be an erasable-programmable read-only memory (EPROM) chip, a programmable logic device configuration data loading chip with built-in memory (sometimes referred to as a "configuration device"), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses, traces, and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. Logic design system 56 may be based on one or more computers and one or more software programs. In general, software and data may be stored on any computer-readable medium (storage) in system 56 and is shown schematically as storage 60 in FIG. 2.

In a typical scenario, logic design system 56 is used by a logic designer to create a custom circuit design. The system 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38.

After device 10 is initially loaded with a set of configuration data (e.g., using configuration device 40), device 10 may be reconfigured by loading a different set of configuration data. Sometimes it may be desirable to reconfigure only a portion of the memory cells on device 10 via a process sometimes referred to as partial reconfiguration. As memory cells are typically arranged in an array, partial reconfiguration can be performed by writing new data values only into selected portion(s) in the array while leaving portions of array other than the selected portion(s) in their original state.

It can be a significant undertaking to design and implement a desired (custom) logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

Figure 3:
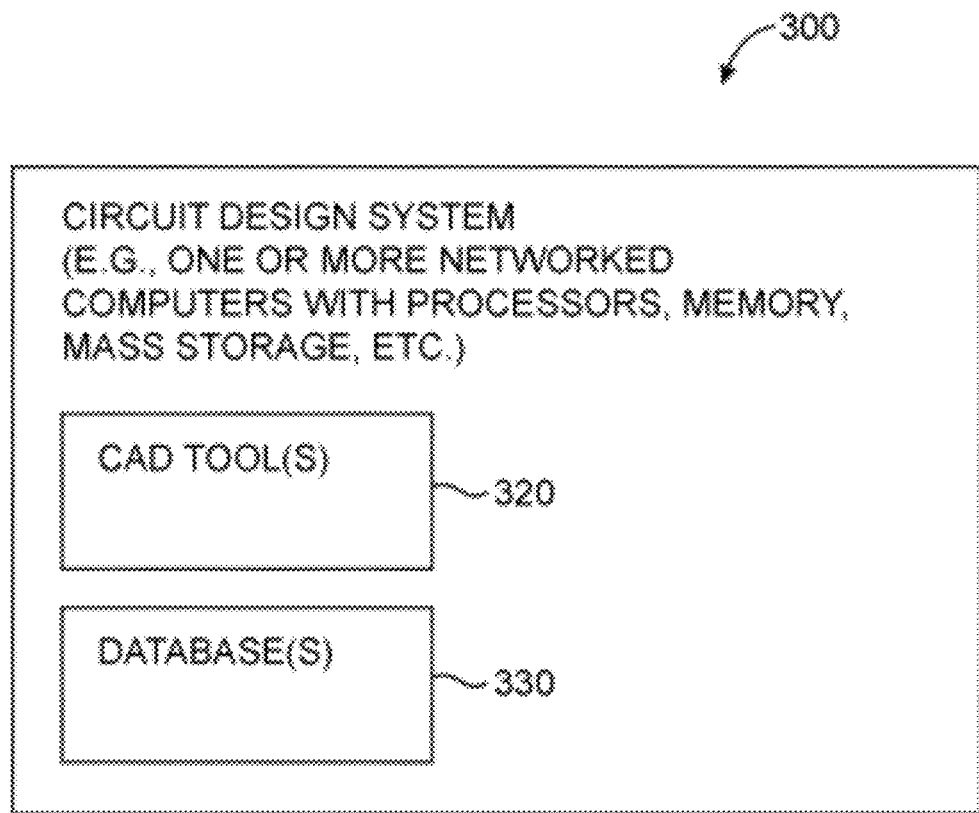
FIG. 3 is a diagram of a circuit design system that may be used to design integrated circuits in accordance with an embodiment.

An illustrative logic circuit design system 300 in accordance with an embodiment is shown in FIG. 3. If desired, circuit design system of FIG. 3 may be used in a logic design system such as logic design system 56 shown in FIG. 2.

Circuit design system 300 may be implemented on integrated circuit design computing equipment. For example, system 300 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 320 and databases 330 reside on system 300. During operation, executable software such as the software of computer aided design tools 320 runs on the processor(s) of system 300. Databases 330 are used to store data for the operation of system 300. In general, software and data may be stored on non-transitory computer readable storage media (e.g., tangible computer readable storage media). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Software stored on the non-transitory computer readable storage media may be executed on system 300. When the software of system 300 is installed, the storage of system 300 has instructions and data that cause the computing equipment in system 300 to execute various methods (processes). When performing these processes, the computing equipment is configured to implement the functions of circuit design system 300.

The computer aided design (CAD) tools 320, some or all of which are sometimes referred to collectively as a CAD tool, a circuit design tool, or an electronic design automation (EDA) tool, may be provided by a single vendor or by multiple vendors. Tools 320 may be provided as one or more suites of tools (e.g., a compiler suite for performing tasks associated with implementing a circuit design in a programmable logic device) and/or as one or more separate software components (tools). Database(s) 330 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
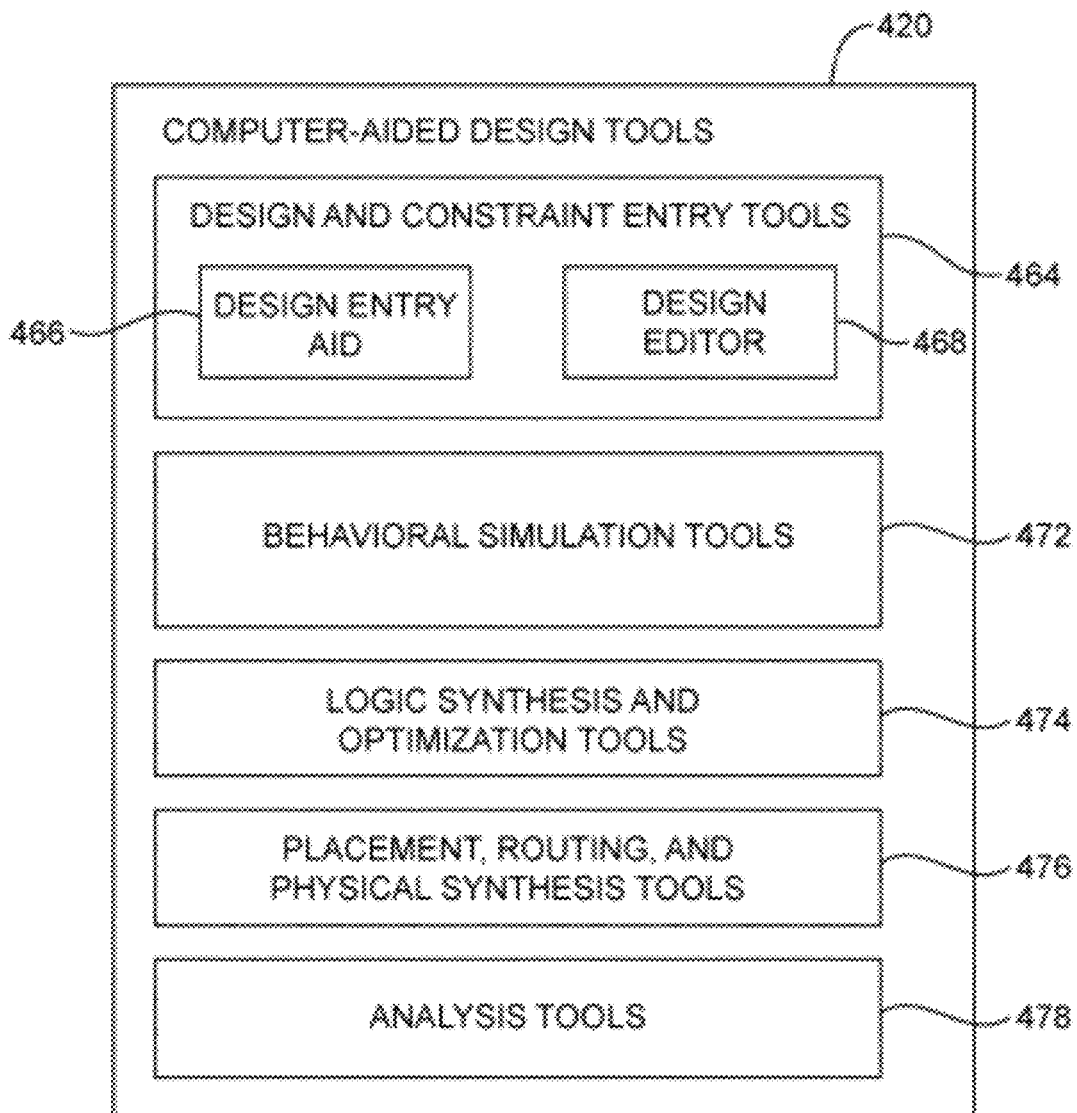
FIG. 4 is a diagram of illustrative computer-aided design (CAD) tools that may be used in a circuit design system in accordance with an embodiment.

Illustrative computer aided design tools 420 that may be used in a circuit design system such as circuit design system 300 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 464. Design and constraint entry tools 464 may include tools such as design and constraint entry aid 466 and design editor 468. Design and constraint entry aids such as aid 466 may be used to help a circuit designer locate a desired design from a library of existing circuit designs and may provide computer-aided assistance to the circuit designer for entering (specifying) the desired circuit design.

As an example, design and constraint entry aid 466 may be used to present screens of options for a user. The user may click on on-screen options to select whether the circuit being designed should have certain features. Design editor 468 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 464 may be used to allow a circuit designer to provide a desired circuit design using any suitable format. For example, design and constraint entry tools 464 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 464 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 464 may allow the circuit designer to provide a circuit design to the circuit design system 300 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 468. Blocks of code may be imported from user-maintained or commercial libraries if desired.

After the design has been entered using design and constraint entry tools 464, behavioral simulation tools 472 may be used to simulate the functionality of the circuit design. If the functionality of the design is incomplete or incorrect, the circuit designer can make changes to the circuit design using design and constraint entry tools 464. The functional operation of the new circuit design may be verified using behavioral simulation tools 472 before synthesis operations have been performed using tools 474. Simulation tools such as behavioral simulation tools 472 may also be used at other stages in the design flow if desired (e.g., after logic synthesis). The output of the behavioral simulation tools 472 may be provided to the circuit designer in any suitable format (e.g., truth tables, timing diagrams, etc.).

Once the functional operation of the circuit design has been determined to be satisfactory, logic synthesis and optimization tools 474 may generate a gate-level netlist of the circuit design, for example using gates from a particular library pertaining to a targeted process supported by a foundry, which has been selected to produce the integrated circuit. Alternatively, logic synthesis and optimization tools 474 may generate a gate-level netlist of the circuit design using gates of a targeted programmable logic device (i.e., in the logic and interconnect resources of a particular programmable logic device product or product family).

Logic synthesis and optimization tools 474 may optimize the design by making appropriate selections of hardware to implement different logic functions in the circuit design based on the circuit design data and constraint data entered by the logic designer using tools 464. As an example, logic synthesis and optimization tools 474 may perform multi-level logic optimization and technology mapping based on the length of a combinational path between registers in the circuit design and corresponding timing constraints that were entered by the logic designer using tools 464.

After logic synthesis and optimization using tools 474, the circuit design system may use tools such as placement, routing, and physical synthesis tools 476 to perform physical design steps (layout synthesis operations). Tools 476 can be used to determine where to place each gate of the gate-level netlist produced by tools 474. For example, if two counters interact with each other, tools 476 may locate these counters in adjacent regions to reduce interconnect delays or to satisfy timing requirements specifying the maximum permitted interconnect delay. Tools 476 create orderly and efficient implementations of circuit designs for any targeted integrated circuit (e.g., for a given programmable integrated circuit such as an FPGA).

Tools such as tools 474 and 476 may be part of a compiler suite (e.g., part of a suite of compiler tools provided by a programmable logic device vendor). In certain embodiments, tools such as tools 474, 476, and 478 may also include timing analysis tools such as timing estimators. This allows tools 474 and 476 to satisfy performance requirements (e.g., timing requirements) before actually producing the integrated circuit.

After an implementation of the desired circuit design has been generated using tools 476, the implementation of the design may be analyzed and tested using analysis tools 478. For example, analysis tools 478 may include timing analysis tools, power analysis tools, or formal verification tools, just to name few.

After satisfactory optimization operations have been completed using tools 420 and depending on the targeted integrated circuit technology, tools 420 may produce a mask-level layout description of the integrated circuit or configuration data for programming the programmable logic device.

Figure 5:
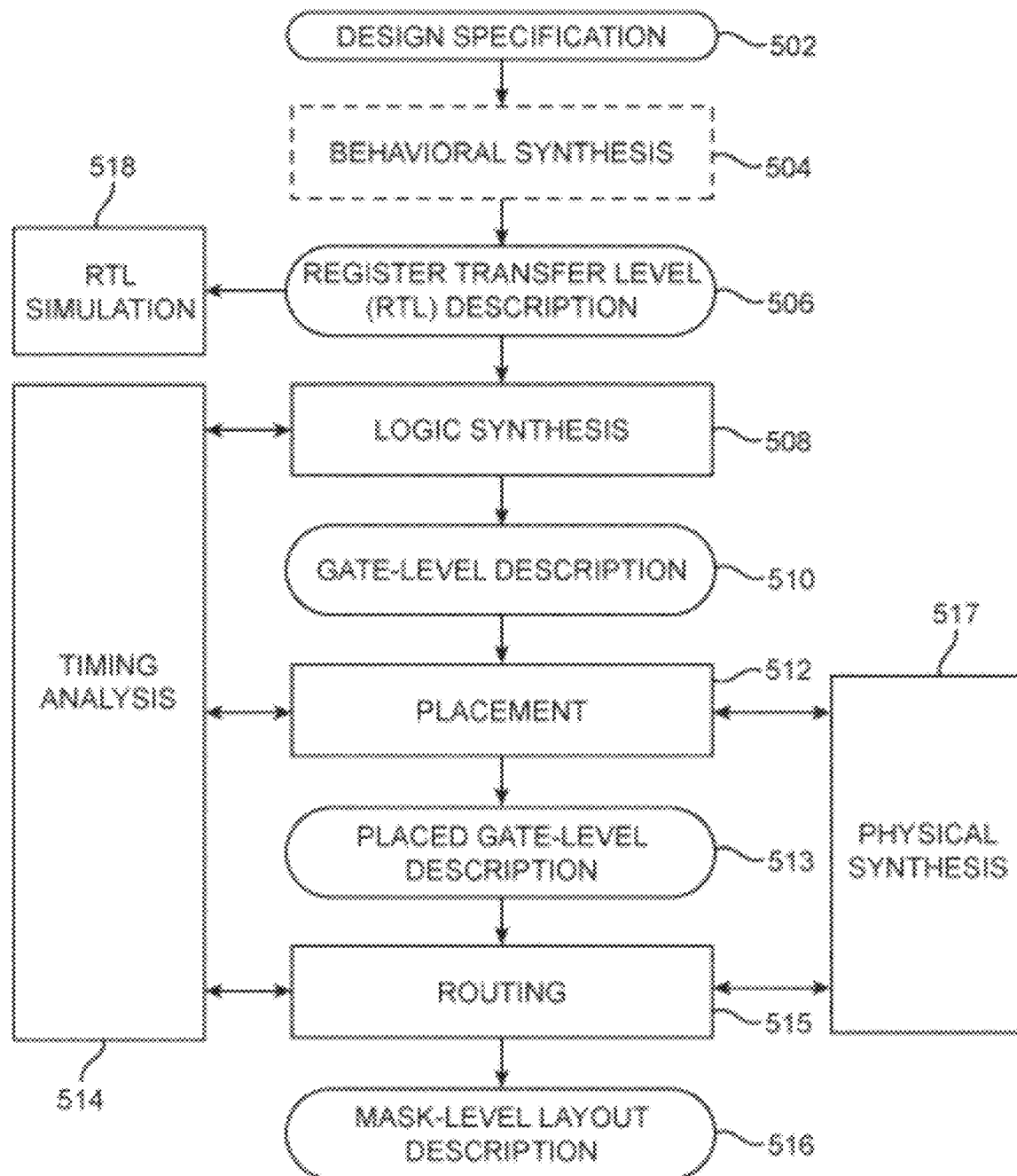
FIG. 5 is a flow chart of illustrative steps for designing an integrated circuit in accordance with an embodiment.

Illustrative operations involved in using tools 420 of FIG. 4 to produce the mask-level layout description of the integrated circuit are shown in FIG. 5. As shown in FIG. 5, a circuit designer may first provide a design specification 502. The design specification 502 may, in general, be a behavioral description provided in the form of an application code (e.g., C code, C++ code, SystemC code, OpenCL code, etc.). In some scenarios, the design specification may be provided in the form of a register transfer level (RTL) description 506.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation or in the form of a code using OpenCL, MATLAB, Simulink, or other high-level synthesis (HLS) language.

In general, the behavioral design specification 502 may include untimed or partially timed functional code (i.e., the application code does not describe cycle-by-cycle hardware behavior), whereas the RTL description 506 may include a fully timed design description that details the cycle-by-cycle behavior of the circuit at the register transfer level.

Design specification 502 or RTL description 506 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 502, the RTL description 506 (e.g., as a pragma or as an assertion), in a constraint file, or through user input (e.g., using the design and constraint entry tools 464 of FIG. 4), to name a few.

At step 504, behavioral synthesis (sometimes also referred to as algorithmic synthesis) may be performed to convert the behavioral description into an RTL description 506. Step 504 may be skipped if the design specification is already provided in form of an RTL description.

At step 518, behavioral simulation tools 472 may perform an RTL simulation of the RTL description, which may verify the functionality of the RTL description. If the functionality of the RTL description is incomplete or incorrect, the circuit designer can make changes to the HDL code (as an example). During RTL simulation 518, actual results obtained from simulating the behavior of the RTL description may be compared with expected results.

During step 508, logic synthesis operations may generate gate-level description 510 using logic synthesis and optimization tools 474 from FIG. 4. The output of logic synthesis 508 is a gate-level description 510 of the design.

During step 512, placement operations using for example placement tools 476 of FIG. 4 may place the different gates in gate-level description 510 in a preferred location on the targeted integrated circuit to meet given target criteria (e.g., minimize area and maximize routing efficiency or minimize path delay and maximize clock frequency or minimize overlap between logic elements, or any combination thereof). The output of placement 512 is a placed gate-level description 513, which satisfies the legal placement constraints of the underlying target device.

During step 515, routing operations using for example routing tools 476 of FIG. 4 may connect the gates from the placed gate-level description 513. Routing operations may attempt to meet given target criteria (e.g., minimize congestion, minimize path delay and maximize clock frequency, satisfy minimum delay requirements, or any combination thereof). The output of routing 515 is a mask-level layout description 516 (sometimes referred to as routed gate-level description 516). The mask-level layout description 516 generated by the design flow of FIG. 5 may sometimes be referred to as a device configuration bit stream or a device configuration image.

While placement and routing is being performed at steps 512 and 515, physical synthesis operations 517 may be concurrently performed to further modify and optimize the circuit design (e.g., using physical synthesis tools 476 of FIG. 4).

Multi-Tenant Usage

In implementations of the disclosure, programmable integrated circuit device 10 may be configured using tools described in FIGS. 2-5 to support a multi-tenant usage model or scenario. As noted above, examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few. System configurations in which device 10 is a programmable logic device such as an FPGA is sometimes described as an example but is not intended to limit the scope of the present embodiments.

Figure 6:
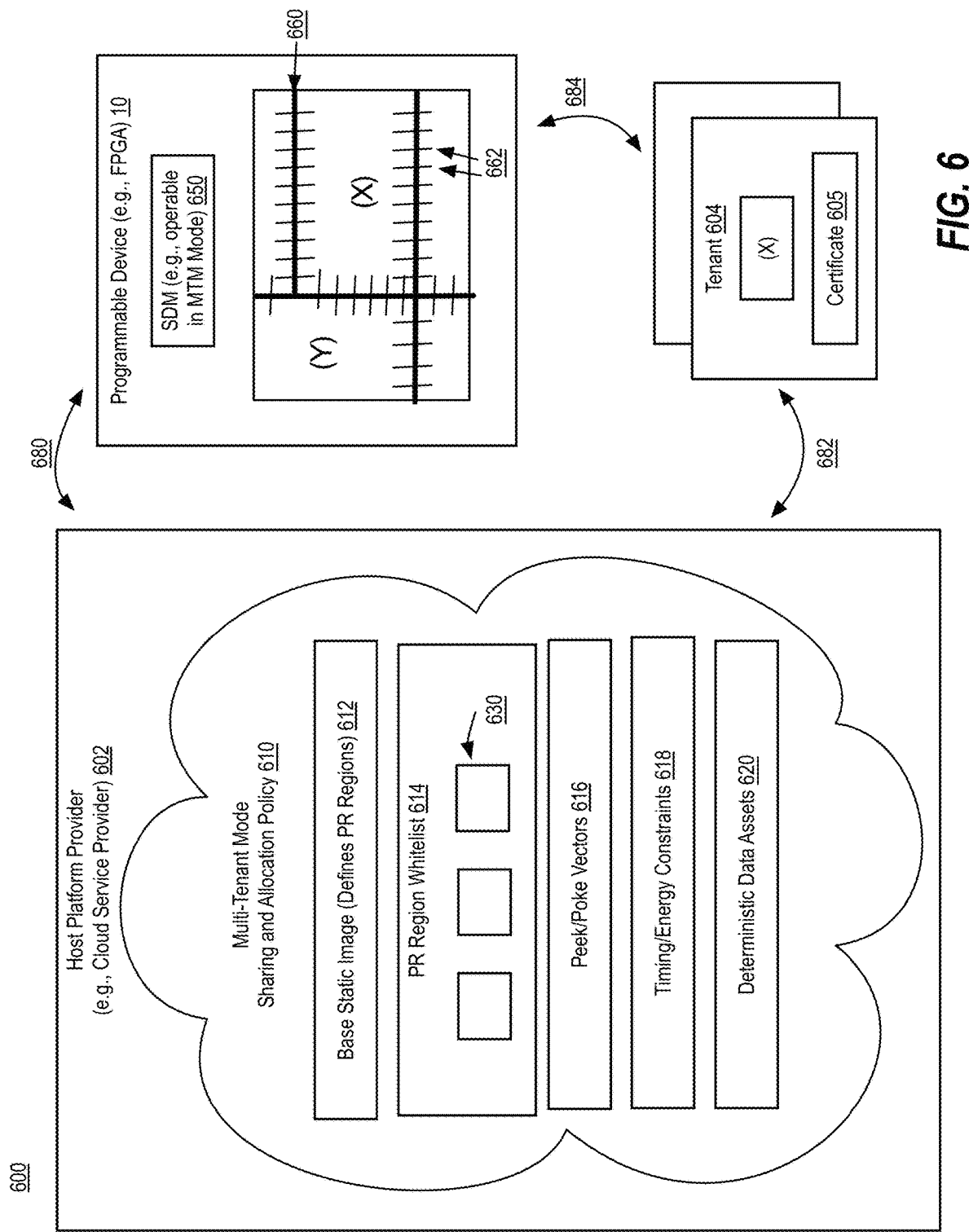
FIG. 6 is a diagram of an illustrative multitenancy system in accordance with an embodiment.

In accordance with an embodiment, FIG. 6 is a diagram of a multitenancy system such as system 600. As shown in FIG. 6, system 600 may include at least a host platform provider 602 (e.g., a server, a cloud service provider or "CSP"), a programmable integrated circuit device 10 such as an FPGA, and multiple tenants 604 (sometimes referred to as "clients"). The CSP 602 may interact with FPGA 10 via communications path 680 and may, in parallel, interact with tenants 604 via communications path 682. The FPGA 10 may separately interact with tenants 604 via communications path 684. In a multitenant usage model, FPGA 10 may be provisioned by the CSP 602 to support each of various tenants/clients 604 running their own separate applications. It may be assumed that the tenants do not trust each other, that the clients do not trust the CSP, and that the CSP does not trust the tenants.

The FPGA 10 may include a secure device manager (SDM) 650 that acts as a configuration manager and security enclave for the FPGA 10. The SDM 650 can conduct reconfiguration and security functions for the FPGA 10. For example, the SDM 650, can conduct functions including, but not limited to, sectorization, PUF key protection, key management, hard encrypt/authenticate engines, and zeroization. Additionally, environmental sensors (not shown) of the FPGA 10 that monitor voltage and temperature can be controlled by the SDM. Furthermore, device maintenance functions, such as secure return material authorization (RMA) without revealing encryption keys, secure debug of designs and ARM code, and secure key managed are additional functions enabled by the SDM 650.

Cloud service provider 602 may provide cloud services accelerated on one or more accelerator devices such as application-specific integrated circuits (ASICs), graphics processor units (GPUs), and FPGAs to multiple cloud customers (i.e., tenants). In the context of FPGA-as-a-service usage model, cloud service provider 602 may offload more than one workload to an FPGA 10 so that multiple tenant workloads may run simultaneously on the FPGA as different partial reconfiguration (PR) workloads. In such scenarios, FPGA 10 can provide security assurances and PR workload isolation when security-sensitive workloads (or payloads) are executed on the FPGA.

Cloud service provider 602 may define a multitenancy mode (MTM) sharing and allocation policy 610. The MTM sharing and allocation policy 610 may set forth a base configuration bitstream such as base static image 612, a partial reconfiguration region allowlist such as PR allowlist 614, peek and poke vectors 616, timing and energy constraints 618 (e.g., timing and power requirements for each potential tenant or the overall multitenant system), deterministic data assets 620 (e.g., a hash list of binary assets or other reproducible component that can be used to verify the proper loading of tenant workloads into each PR region), etc. Policy 610 is sometimes referred to as an FPGA multitenancy mode contract. One or more components of MTM sharing and allocation policy 610 such as the base static image 612, PR region allowlist 61, and peek/poke vectors 616 may be generated by the cloud service provider using design tools 420 of FIG. 4.

Figure 7:
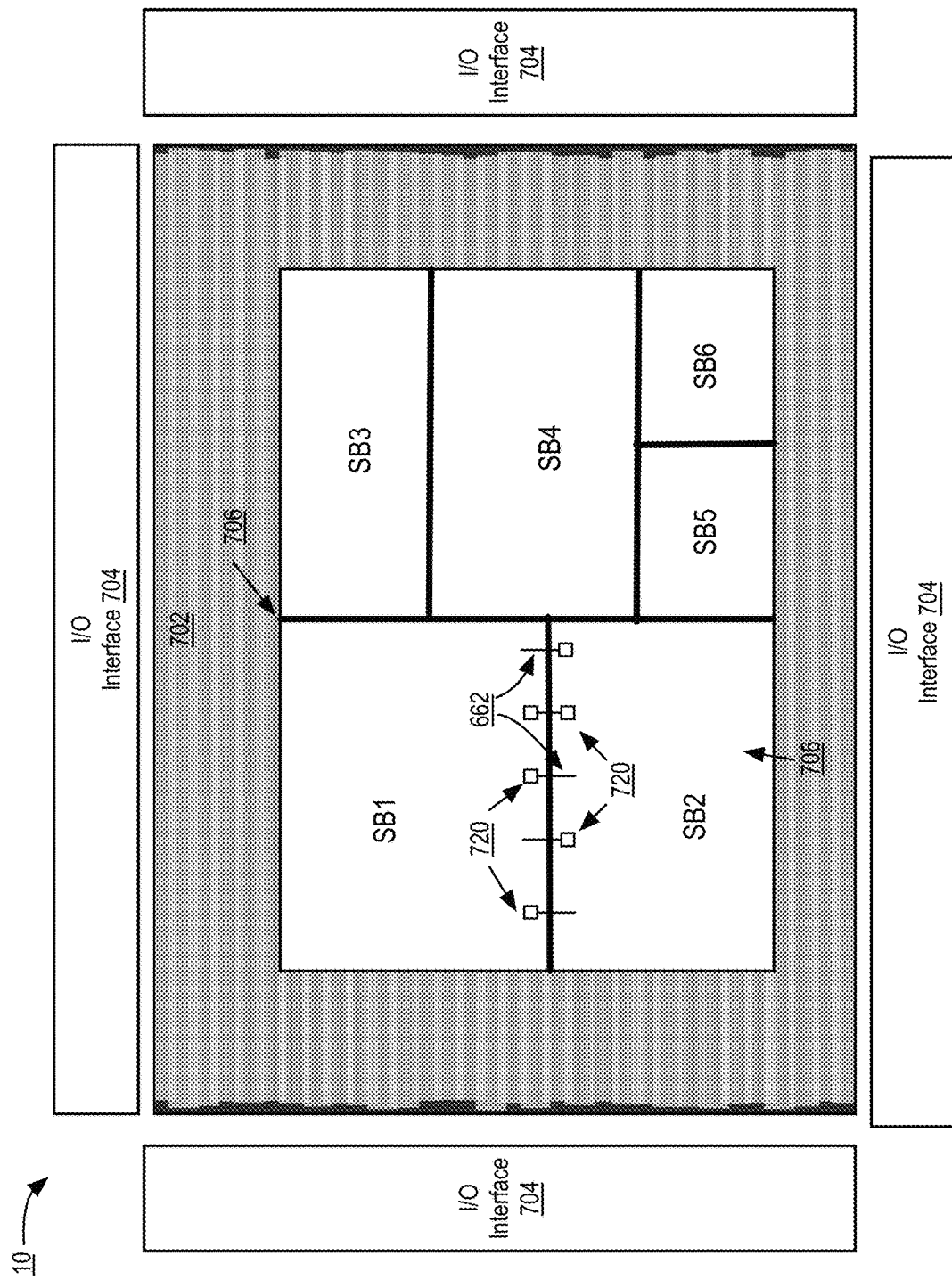
FIG. 7 is a diagram of a programmable integrated circuit having a static region and multiple partial reconfiguration (PR) sandbox regions in accordance with an embodiment.

The base static image 612 may define a base design for device 10 (see, e.g., FIG. 7). As shown in FIG. 7, the base static image 612 may define the input-output interfaces 704, one or more static region(s) 702, and multiple partial reconfiguration (PR) regions each of which may be assigned to a respective tenant to support an isolated workload. Static region 702 may be a region where all parties agree that the configuration bits cannot be changed by partial reconfiguration. For example, static region may be owned by the server/host/CSP. Any resource on device 10 should be assigned either to static region 702 or one of the PR regions (but not both).

The PR region allowlist 614 may define a list of available PR regions 630 (see FIG. 6). Each PR region for housing a particular tenant may be referred to as a PR "sandbox," in the sense of providing a trusted execution environment (TEE) for providing spatial/physical isolation and preventing potential undesired interference among the multiple tenants. Each PR sandbox may provide assurance that the contained PR tenant workload sometimes referred to as the PR client persona) is limited to configured its designated subset of the FPGA fabric and is protected from access by other PR workloads. The precise allocation of the PR sandbox regions and the boundaries 660 of each PR sandbox may also be defined by the base static image. Additional reserved padding area such as area 706 in FIG. 7 may be used to avoid electrical interference and coupling effects such as crosstalk. Additional circuitry may also be formed in padding area 706 for actively detecting and/or compensating unwanted effects generated as a result of electrical interference, noise, or power surge.

Any wires such as wires 662 crossing a PR sandbox boundary may be assigned to either an associated PR sandbox or to the static region 702. If a boundary-crossing wire 662 is assigned to a PR sandbox region, routing multiplexers outside that sandbox region controlling the wire should be marked as not to be used. If a boundary-cross wire 662 is assigned to the static region, the routing multiplexers inside that sandbox region controlling the wire should be marked as not belonging to that sandbox region (e.g., these routing multiplexers should be removed from a corresponding PR region mask).

Any hard (non-reconfigurable) embedded intellectual property (IP) blocks such as memory blocks (e.g., random-access memory blocks) or digital signal processing (DSP) blocks that are formed on FPGA 10 may also be assigned either to a PR sandbox or to the static region. In other words, any given hard IP functional block should be completely owned by a single entity (e.g., any fabric configuration for a respective embedded functional block is either allocated to a corresponding PR sandbox or the static region).

Disaggregated Compute in Programmable Integrated Circuits

As previously described, disaggregated computing is on the rise in data centers. CSPs are deploying solutions where processing of a workload is distributed on disaggregated compute resources such as CPUs and hardware accelerators, such as FPGAs, that are connected via network instead of being on the same platform, connected via physical links such as PCIe. The compute disaggregation enables improved resource utilization and lowers Total Cost of Ownership (TCO) by enabling making more efficient use of available resources. Disaggregation also enables pooling a large number of hardware accelerators for large computation making the computation more efficient and performant.

Embodiments provide for a novel technique for disaggregated computing in programmable integrated circuits, such as the programmable logic devices described above with respect to FIGS. 1-7. This novel technique is used to provide for the above-noted improved computation efficiency and performance in computing architectures seeking to implement disaggregate computing. Implementations of the disclosure provide enabling secure communication via attestation of multi-tenant configurations on accelerator devices, as discussed further below with respect to FIGS. 8-17.

Figure 8:
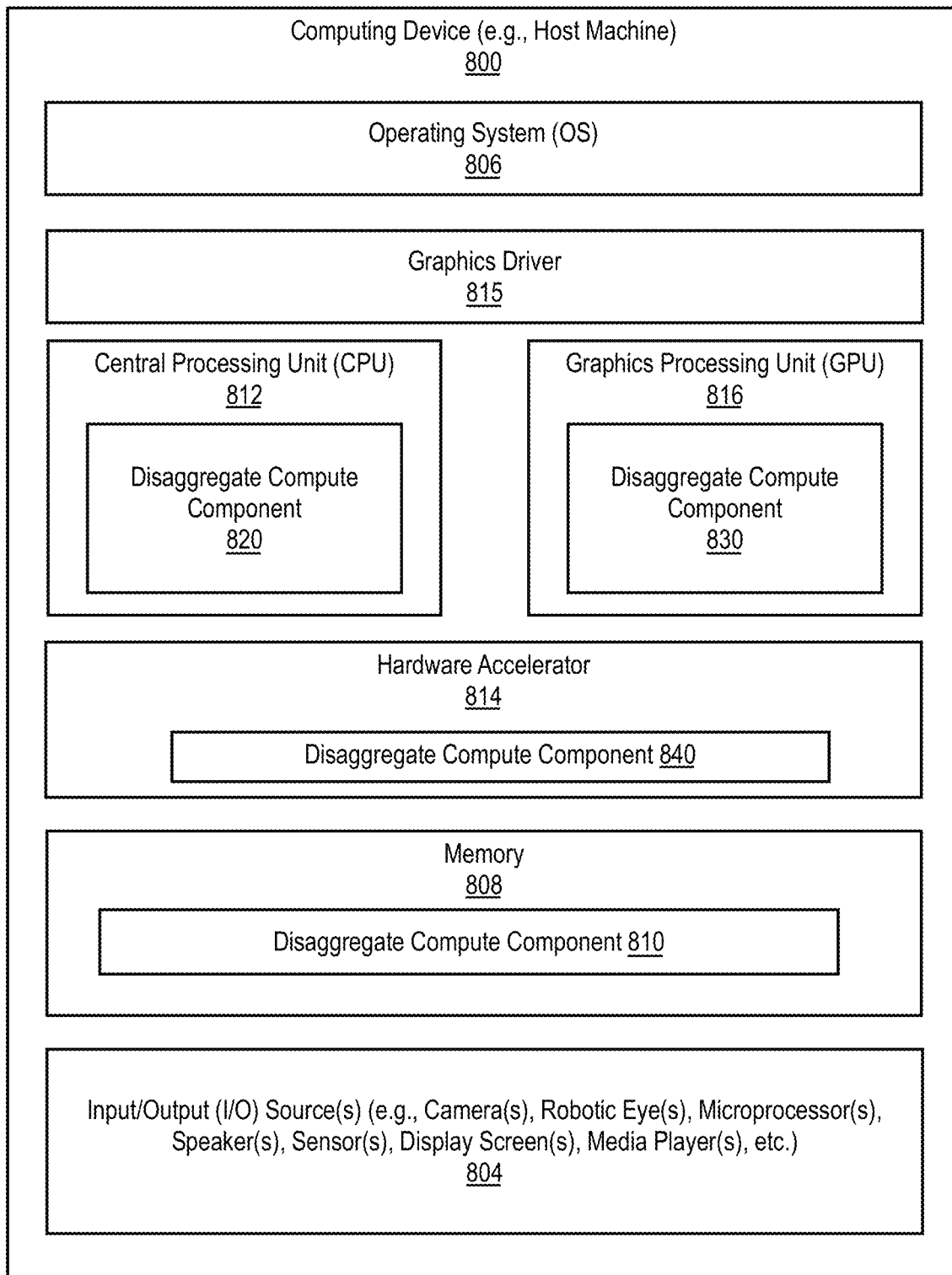
FIG. 8 illustrates a computing device employing a disaggregate compute component, according to implementations of the disclosure.

FIG. 8 illustrates a computing device 800 employing a disaggregate compute component 810 according to one implementation of the disclosure. Computing device 800 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, automotive infotainment devices, etc.

In some embodiments, computing device 800 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 800 may include a computer platform hosting an integrated circuit ("IC"), such as a system on a chip ("SOC" or "SOC"), integrating various hardware and/or software components of computing device 800 on a single chip.

As illustrated, in one embodiment, computing device 800 may include any number and type of hardware and/or software components, such as (without limitation) graphics processing unit ("GPU" or simply "graphics processor") 816, graphics driver (also referred to as "GPU driver", "graphics driver logic", "driver logic", user-mode driver (UMD), user-mode driver framework (UMDF), or simply "driver") 815, central processing unit ("CPU" or simply "application processor") 812, hardware accelerator 814 (such as programmable logic device 10 described above with respect to FIGS. 1-7 including, but not limited to, an FPGA, ASIC, a re-purposed CPU, or a re-purposed GPU, for example), memory 808, network devices, drivers, or the like, as well as input/output (I/O) sources 804, such as touchscreens, touch panels, touch pads, virtual or regular keyboards, virtual or regular mice, ports, connectors, etc. Computing device 800 may include operating system (OS) 806 serving as an interface between hardware and/or physical resources of the computing device 800 and a user.

It is to be appreciated that a lesser or more equipped system than the example described above may be utilized for certain implementations. Therefore, the configuration of computing device 800 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, disaggregate compute component 810 may be hosted by memory 808 in communication with I/O source(s) 804, such as microphones, speakers, etc., of computing device 800. In another embodiment, disaggregate compute component 810 may be part of or hosted by operating system 806. In yet another embodiment, disaggregate compute component 810 may be hosted or facilitated by graphics driver 815. In yet another embodiment, disaggregate compute component 810 may be hosted by or part of a hardware accelerator 814; for example, disaggregate compute component 810 may be embedded in or implemented as part of the processing hardware of hardware accelerator 814, such as in the form of disaggregate compute component 840. In yet another embodiment, disaggregate compute component 810 may be hosted by or part of graphics processing unit ("GPU" or simply graphics processor") 816 or firmware of graphics processor 816; for example, disaggregate compute component may be embedded in or implemented as part of the processing hardware of graphics processor 816, such as in the form of disaggregate compute component 830. Similarly, in yet another embodiment, disaggregate compute evaluation component 810 may be hosted by or part of central processing unit ("CPU" or simply "application processor") 812; for example, disaggregate compute evaluation component 820 may be embedded in or implemented as part of the processing hardware of application processor 812, such as in the form of disaggregate compute component 820. In some embodiments, disaggregate compute component 810 may be provided by one or more processors including one or more of a graphics processor, an application processor, and another processor, wherein the one or more processors are co-located on a common semiconductor package.

It is contemplated that embodiments are not limited to certain implementation or hosting of disaggregate compute component 810 and that one or more portions or components of disaggregate compute component 810 may be employed or implemented as hardware, software, or any combination thereof, such as firmware. In one embodiment, for example, the disaggregate compute component may be hosted by a machine learning processing unit which is different from the GPU. In another embodiment, the disaggregate compute component may be distributed between a machine learning processing unit and a CPU. In another embodiment, the disaggregate compute component may be distributed between a machine learning processing unit, a CPU and a GPU. In another embodiment, the disaggregate compute component may be distributed between a machine learning processing unit, a CPU, a GPU, and a hardware accelerator.

Computing device 800 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 9:
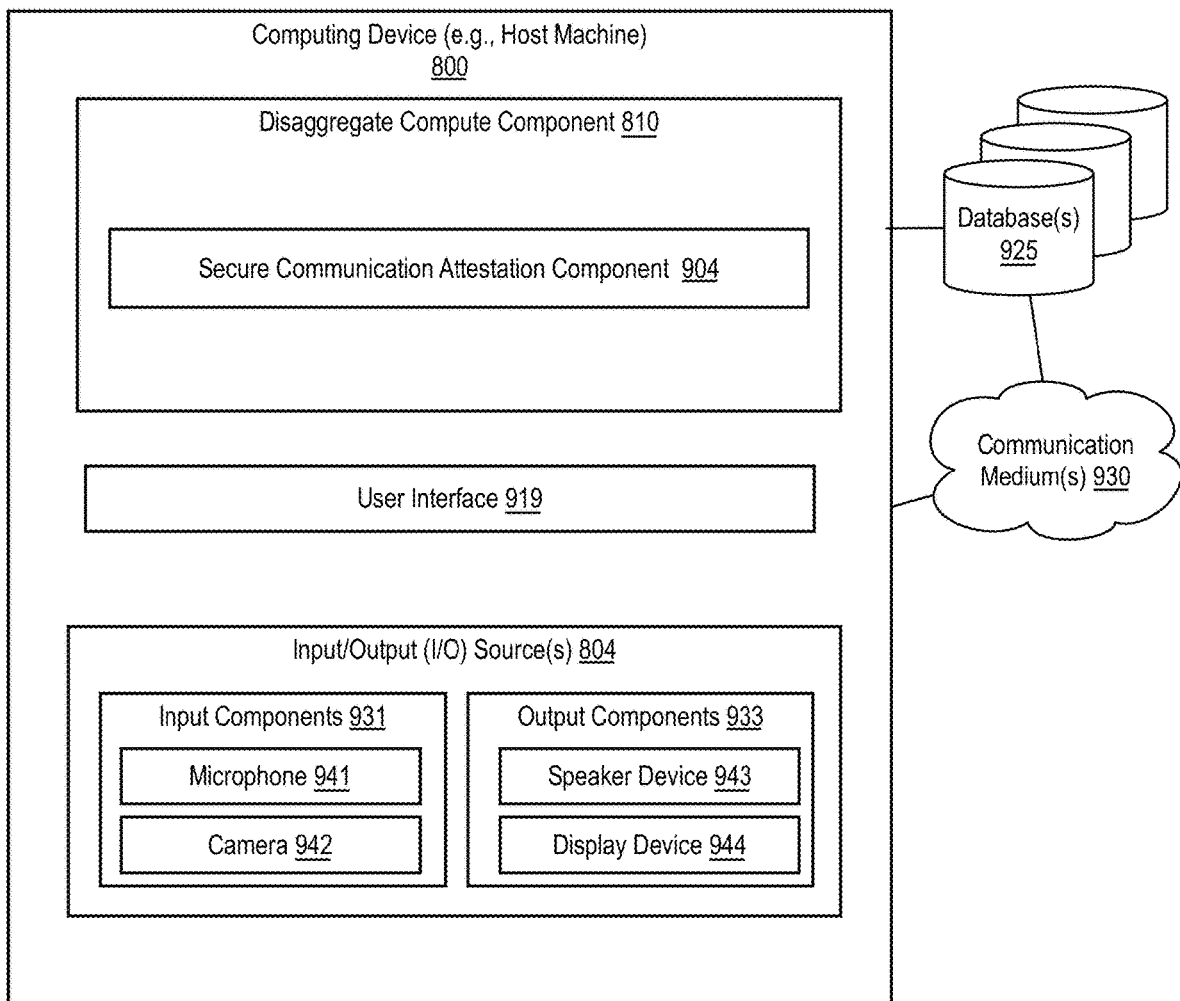
FIG. 9 illustrates a disaggregate compute component, according to one implementation of the disclosure.

FIG. 9 illustrates disaggregate compute component 810 of FIG. 8, according to one implementation of the disclosure. For brevity, many of the details already discussed with reference to FIG. 8 are not repeated or discussed hereafter. In one embodiment, disaggregate compute component 810 may be the same as any of disaggregate compute components 810, 820, 830, 840 described with respect to FIG. 8 and may include any number and type of components, such as (without limitations): secure communication attestation component 904.

Computing device 800 is further shown to include user interface 919 (e.g., graphical user interface (GUI) based user interface, Web browser, cloud-based platform user interface, software application-based user interface, other user or application programming interfaces (APIs), etc.). Computing device 800 may further include I/O source(s) 804 having input component (s) 931, such as camera(s) 942 (e.g., Intel® RealSense™ camera), sensors, microphone(s) 941, etc., and output component(s) 933, such as display device(s) or simply display(s) 944 (e.g., integral displays, tensor displays, projection screens, display screens, etc.), speaker devices(s) or simply speaker(s), etc.

Computing device 800 is further illustrated as having access to and/or being in communication with one or more database(s) 925 and/or one or more of other computing devices over one or more communication medium(s) 930 (e.g., networks such as a proximity network, a cloud network, the Internet, etc.).

In some embodiments, database(s) 925 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or other details, and/or the like.

As aforementioned, computing device 800 may host I/O sources 804 including input component(s) 931 and output component(s) 933. In one embodiment, input component(s) 931 may include a sensor array including, but not limited to, microphone(s) 941 (e.g., ultrasound microphones), camera(s) 942 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 933 may include any number and type of display device(s) 944, projectors, light-emitting diodes (LEDs), speaker(s) 943, and/or vibration motors, etc.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as disaggregate compute component 820, disaggregate compute component 830, and/or disaggregate compute component 840 hosted by application processor 812, graphics processor 816, and/or hardware accelerator 814, respectively, of FIG. 8 having to facilitate or execute the corresponding logic to perform certain tasks.

For example, as illustrated, input component (s) 931 may include any number and type of microphone(s) 941, such as multiple microphones or a microphone array, such as ultrasound microphones, dynamic microphones, fiber optic microphones, laser microphones, etc. It is contemplated that one or more of microphone(s) 941 serve as one or more input devices for accepting or receiving audio inputs (such as human voice) into computing device 800 and converting this audio or sound into electrical signals. Similarly, it is contemplated that one or more of camera(s) 942 serve as one or more input devices for detecting and capturing of image and/or videos of scenes, objects, etc., and provide the captured data as video inputs into computing device 800.

As previously described, disaggregated computing is on the rise in data centers. CSPs are deploying solutions where processing of a workload is distributed on disaggregated compute resources such as CPUs and hardware accelerators, such as FPGAs, that are connected via network instead of being on the same platform, connected via physical links such as PCIe. The compute disaggregation enables improved resource utilization and lowers Total Cost of Ownership (TCO) by enabling making more efficient use of available resources. Disaggregation also enables pooling a large number of hardware accelerators for large computation making the computation more efficient and performant.

Embodiments provide for a novel technique for disaggregate computing for distributed confidential computing environments. This novel technique is used to provide for the above-noted improved computation efficiency and performance in computing architectures seeking to implement disaggregate computing. Implementations of the disclosure utilize a disaggregate compute component 810 to provide enabling secure communication via attestation of multi-tenant configurations on accelerator devices.

With respect to FIG. 9, the disaggregate compute component 810 includes secure communication attestation component 904 to perform the disaggregated computing for programmable integrated circuits of the disaggregate compute component 810 described herein. Further details of secure communication attestation component 904 are described below with respect to FIGS. 10-17.

Enabling Secure Communication Via Attestation of Multi-Tenant Configuration on Cloud FPGAs In some embodiments, an apparatus, system, or process is to provide for enabling secure communication via attestation of multi-tenant configuration on accelerator devices. In one implementation, secure communication attestation component 904 described with respect to FIG. 9 provides the secure communication via attestation of multi-tenant configuration on accelerator devices.

Figure 10:
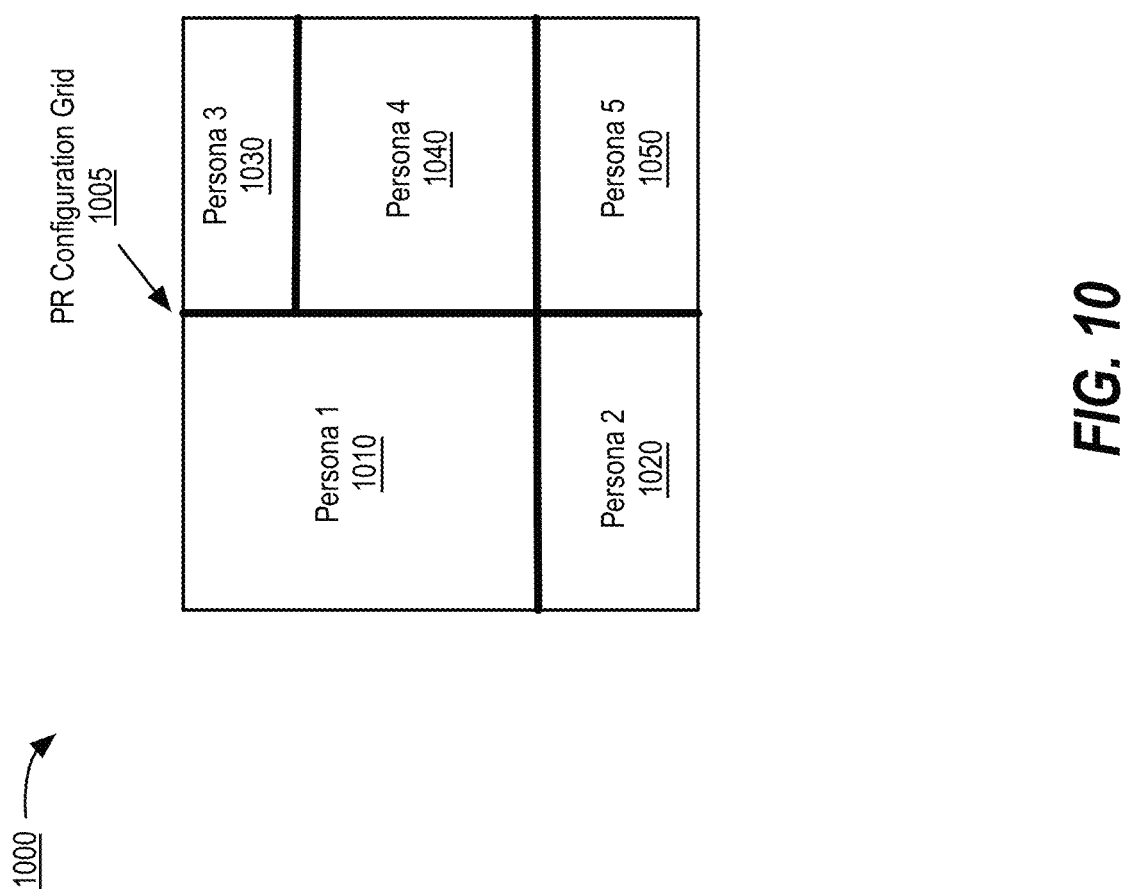
FIG. 10 illustrates an accelerator device hosting mutually-distrustful tenants, in accordance with implementations of the disclosure.

A technical problem encountered with programmable integrated circuits in a disaggregated computing environment includes establishing trust to securely communicate with a region of an accelerator device, such as an FPGA, that is a spatially multi-tenant configured device. FIG. 10 illustrates an accelerator device 1000 hosting mutually-distrustful tenants, in accordance with implementations of the disclosure. In one implementation, accelerator device 1000 is a CSP-owned FPGA. The CSP-owned FPGA 1000 can host mutually-distrustful tenants, each associated with a persona 1010-1050 on the FPGA 1000.

As shown in FIG. 10, FPGA 1000 may include multiple partial reconfiguration (PR) regions each of which may be assigned to a respective tenant (e.g., persona 1 1010, persona 2 1020, persona 3 1030, persona 4, 1040, persona 5 1050) to support an isolated workload. Each PR region for housing a particular tenant may be referred to as a PR "sandbox," in the sense of providing a trusted execution environment (TEE) for providing spatial/physical isolation and preventing potential undesired interference among the multiple tenants. Each PR sandbox may provide assurance that the contained PR tenant workload (sometimes referred to as the PR client persona) is limited to configured its designated subset of the FPGA fabric and is protected from access by other PR workloads. The precise allocation of the PR sandbox regions and the boundaries of each PR sandbox may also be defined by a PR configuration grid 1005. The PR configuration grid 1005 may be used to avoid electrical interference and coupling effects such as crosstalk. Additional circuitry may also be formed in PR configuration grid 1005 for actively detecting and/or compensating unwanted effects generated as a result of electrical interference, noise, or power surge.

In conventional systems, there are no known secure mechanisms or protocols to attest to a multi-tenant configuration of mutually distrustful regions, such as PR regions corresponding to personas 1010-1050 of FPGA 1000 of FIG. 10.

Implementations of the disclosure enable secure PR programming of mutually distrustful tenants on accelerator devices, such as an FPGA (e.g., CSP-owned FPGA 1000 described with respect to FIG. 10). Advantages of implementations of the disclosure for enabling secure communication via attestation of multi-tenant configurations on accelerator devices include, but are not limited to, providing a scalable mechanism that enables a TEE to use the proposed scheme to create a secure communication channel to a given PR region on the FPGA. Another advantage includes being independent of the underlying protocol for attestation (DICE-based, TPM-based, etc.). A further advantage includes providing generic attestation evidence that could be provided by the device to describe the multi-tenant configuration. Another advantage includes higher resource utilization and cost benefits that allow the CSP to deploy more than one secure workload on the same accelerator device.

Figure 11:
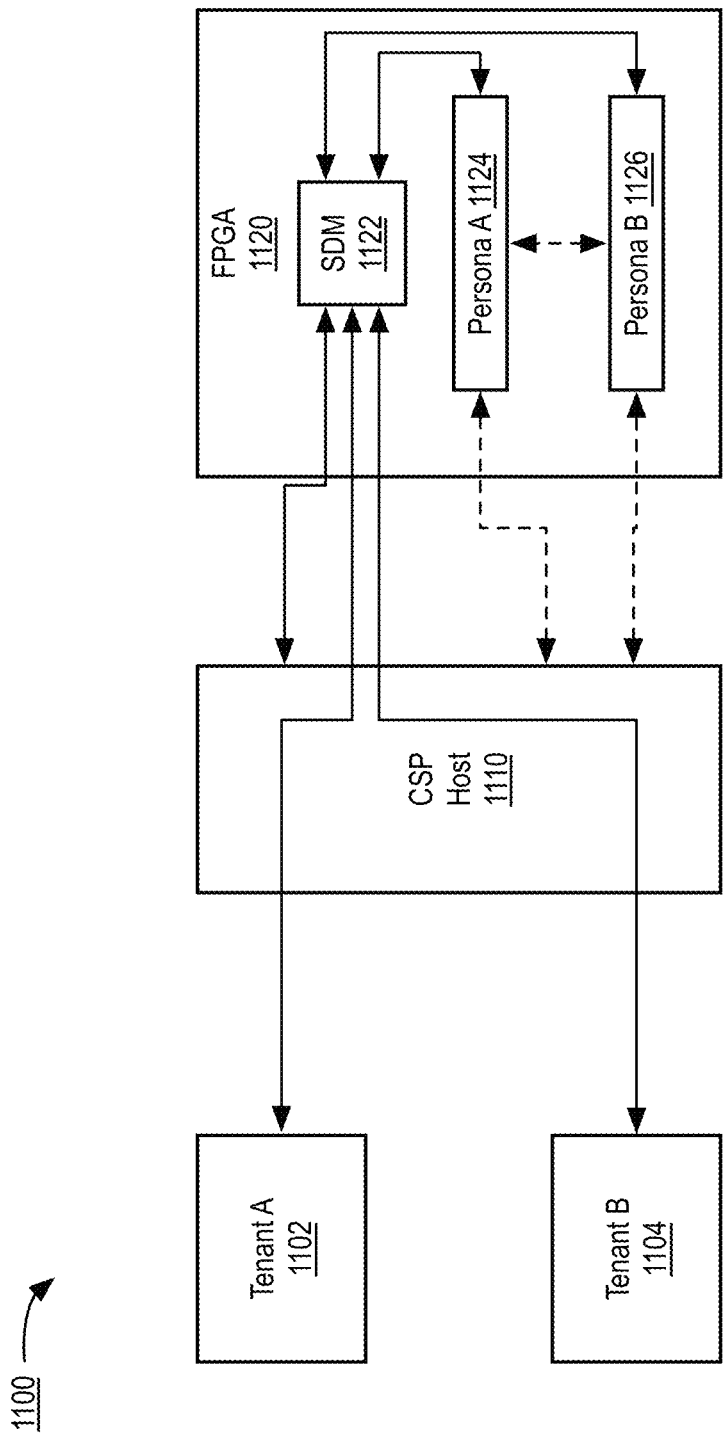
FIG. 11 illustrates a network environment depicting inter-connectivity between entities in a cloud service provider (CSP)-owned field-programmable gate array (FPGA) hosting mutually distrustful tenants, in accordance with implementations of the disclosure.

FIG. 11 illustrates a network environment 1100 depicting interconnectivity between entities in a CSP-owned FPGA hosting mutually distrustful tenants, in accordance with implementations of the disclosure. As illustrated, network environment 1100 includes a plurality of tenants (tenant A 1102, tenant B 1104) communicably coupled to a CSP host 1110 via a network (not shown). The CSP host 1110 provides an FPGA 1120 for use in accelerating workloads of the tenants 1102, 1104. In one implementation, FPGA 1120 may be the same as FPGA 10 described above with respect to FIGS. 1-7.

The FPGA 1120 may be directly or remotely connected to CSP host 1110. The FPGA 1120 receives workloads of each of tenant A 1102 and tenant B 1104 and provides for contained PR tenant workloads for each tenant as persona A 1124 and persona B 1126, respectively. The personas 1124, 1126 are configured in a designated subset of the FPGA fabric are protected from access by other PR tenant workload of other tenants. FPGA 1120 further includes an SDM 1122 that acts as a configuration manager and security enclave for the FPGA 1120. In one implementation, SDM 1122 is the same as SDM 650 described with respect to FIG. 6.

In implementations of the disclosure, a security threat model may be provided in network environment 1100 as detailed below. An objective of the security threat model is to provide tenant bitstream-isolation assurance executing in a multi-tenant platform. In the security threat model, the CSP should not be able to access contents of tenant's PR bitstream. Assets of the security threat model include PR configuration grid integrity (that defines the tenant PR boundaries), CSP's base bitstream integrity, and tenant PR bitstream confidentiality.

The trusted computing base (TCB) of the security threat model includes the accelerator device (FPGA 1120), tenant PR bitstream (e.g., persona A 1124, persona B 1126), and the CSP's base bitstream (not shown in FIG. 11). In some implementations, the TCB further includes a trusted agent (e.g., TEE, RP, controller, etc.) of a host device.

Trust relationships in implementations of the disclosure are detailed as follows:

Entities trusted by everyone: Device-SDM, complex matched filter (CMF) FW, log-structured merge (LSM) tree, network-on-chip (NoC); Trusted circuit design tool may also be a trusted toolchain.

Tenants: Mutually distrusting tenants; Do not trust CSP for bitstream and data.

Figure 12:
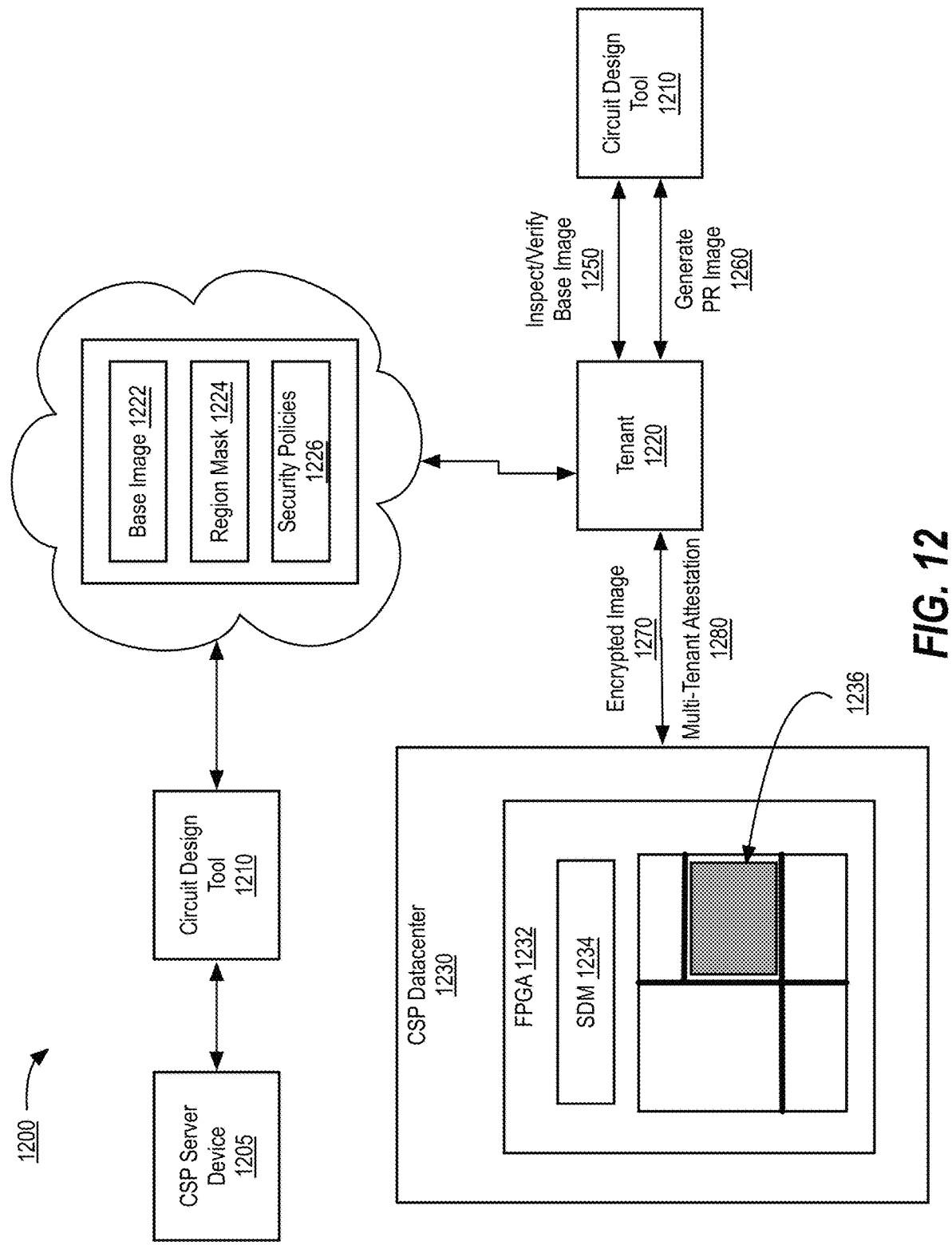
FIG. 12 depicts a security flow for enabling secure communication via attestation of multi-tenant configurations on accelerator devices, in accordance with implementations of the disclosure.

CSP: Distrust Tenants for CSP assets and IP; In TCB for availability conditions of a CSP hosted service FIG. 12 depicts a security flow 1200 for enabling secure communication via attestation of multi-tenant configurations on accelerator devices, in accordance with implementations of the disclosure. An example security flow 1200 of implementations of the disclosure is as follows:

1. CSP 1205 generates base bitstream (i.e., static region) (also referred to as base image 1222) with defined PR regions using a circuit design tool 1210 for a multi-tenant configuration based on usage. CSP also generates a region mask 1224 and security policies 1226. The security policies 1226 may be generated around assurances for a secure deployment model for a given CSP usage.

2. CSP 1205 publishes the base bitstream (base image 1222) with PR boundaries for tenants 1220.

3. Tenants 1220 use a circuit design tool 1210 to inspect and verify 1250 the CSP base bitstream (base image 1222) and PR boundary setup/PR isolation.

4. Tenants 1220 use published CSP's Base Bitstream (base image 1222) to generate PR bitstreams 1260 to fit within one or more PR regions using the circuit design tool 1210.

5. Tenants 1220 inspect device attestation 1280 from the SDM 1234. In some implementations, this may be performed be via a trusted agent (TEE) on the host 1230.

6. Tenants 1220 provide the PR bitstreams (as encrypted images 1270) to the CSP 1205. CSP 1205 does a PR reconfiguration 1236 on the FPGA 1232 using a circuit 1210 design tool.

7. SDM 1234 authorizes the PR request.

Figure 13:
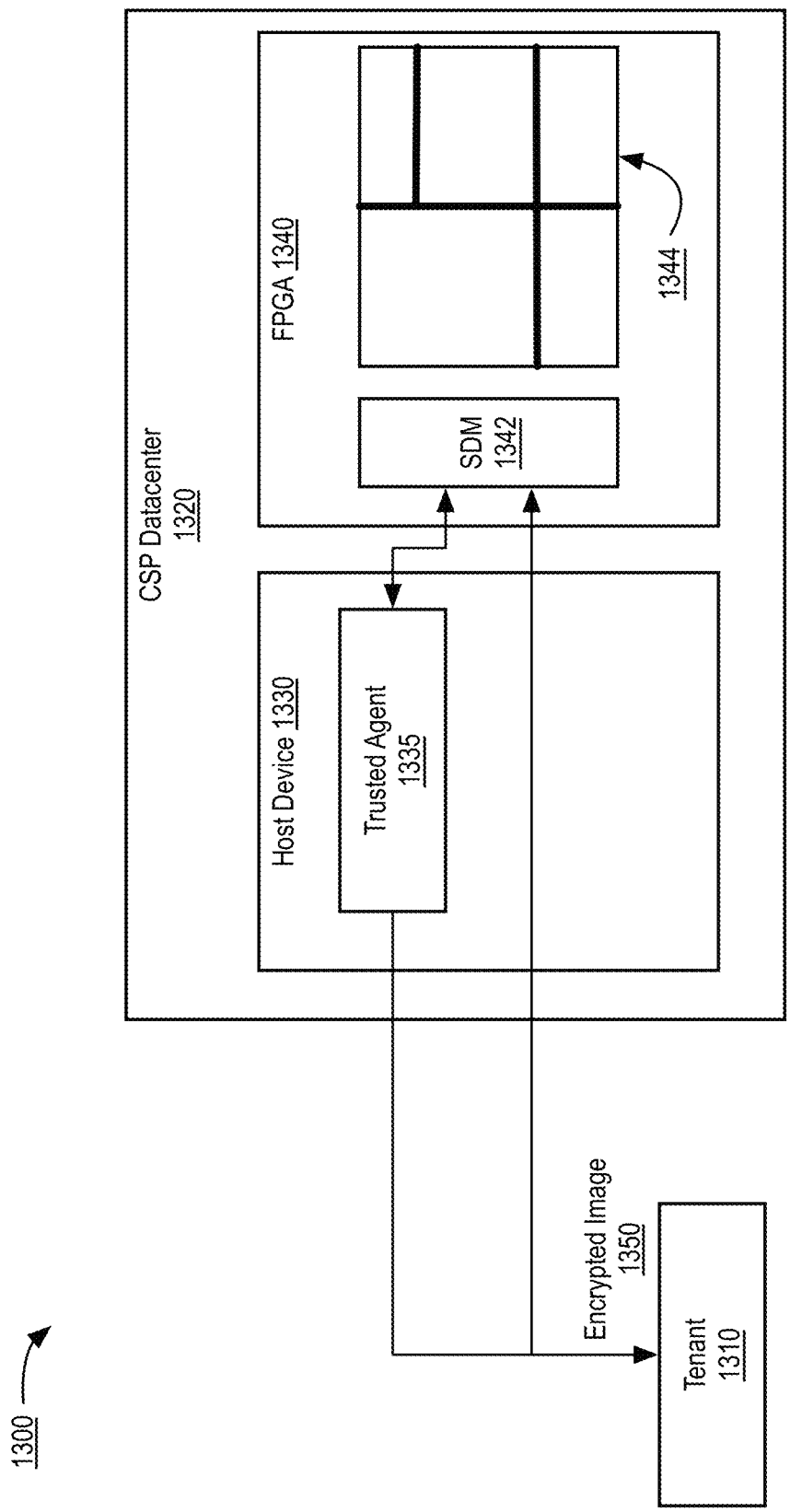
FIG. 13 illustrates a network environment providing secure communication via attestation and key exchange of multi-tenant configurations on accelerators device, in accordance with implementations of the disclosure.

FIG. 13 illustrates a network environment 1300 providing secure communication via attestation and key exchange of multi-tenant configurations on accelerators device, in accordance with implementations of the disclosure. Network environment 1300 may include a tenant 1310 communicably coupled to a CSP data center 1320 via a network (not shown). In one implementation, CSP data center 1320 may include a host device 1330 and an FPGA 1340. FPGA 1340 may be owned and managed by CSP and utilized for acceleration of workloads of tenant 1310.

The secure communication via attestation and key exchange in network environment 1300 may be provided in a variety of different scenarios. A first scenario includes tenant 1310-to-FPGA 1340 attestation with direct upload. In this first scenario, every PR upload utilizes a handshake and runtime context, long-term interoperable tools/protocols. In such a case, the tenant 1310 may not be online to (re-) start their workload. In some implementations, security protocol and data model (SPDM)-based attestation and key exchange may be utilized. The SPDM specification provides message exchange, sequence diagrams, message formats, and other relevant semantics for authentication, firmware measurement, and certificate management.

A second scenario includes tenant 1310-to-FPGA 1340 via a trusted agent (TA) 1335 of the CSP host 1330. In this second scenario, the TA 1335 acts as proxy for the SDM 1342 of the FPGA 1340. In this second scenario, the tenant's 1310 bitstream may be stored on behalf of the tenant 1310. As such, the second scenario allows more flexible allocation/scheduling by the CSP 1320. In this second scenario, low-level PCIe can be mapped to Internet protocol. In some implementations, SPDM-based attestation and key exchange may be utilized.

A third scenario includes remote sealing. In the third scenario, SPDM may be utilized to attest FPGA 1340. The tenant 1310 can seal the PR to an expected TCB and delegate validation to the SDM 1342. The CSP 1320 is then free to orchestrate deployment of encrypted PR workloads. In one implementation, the SDM 1342 can manage a short-lived keypair for remote-encryption to itself.

Figure 14:
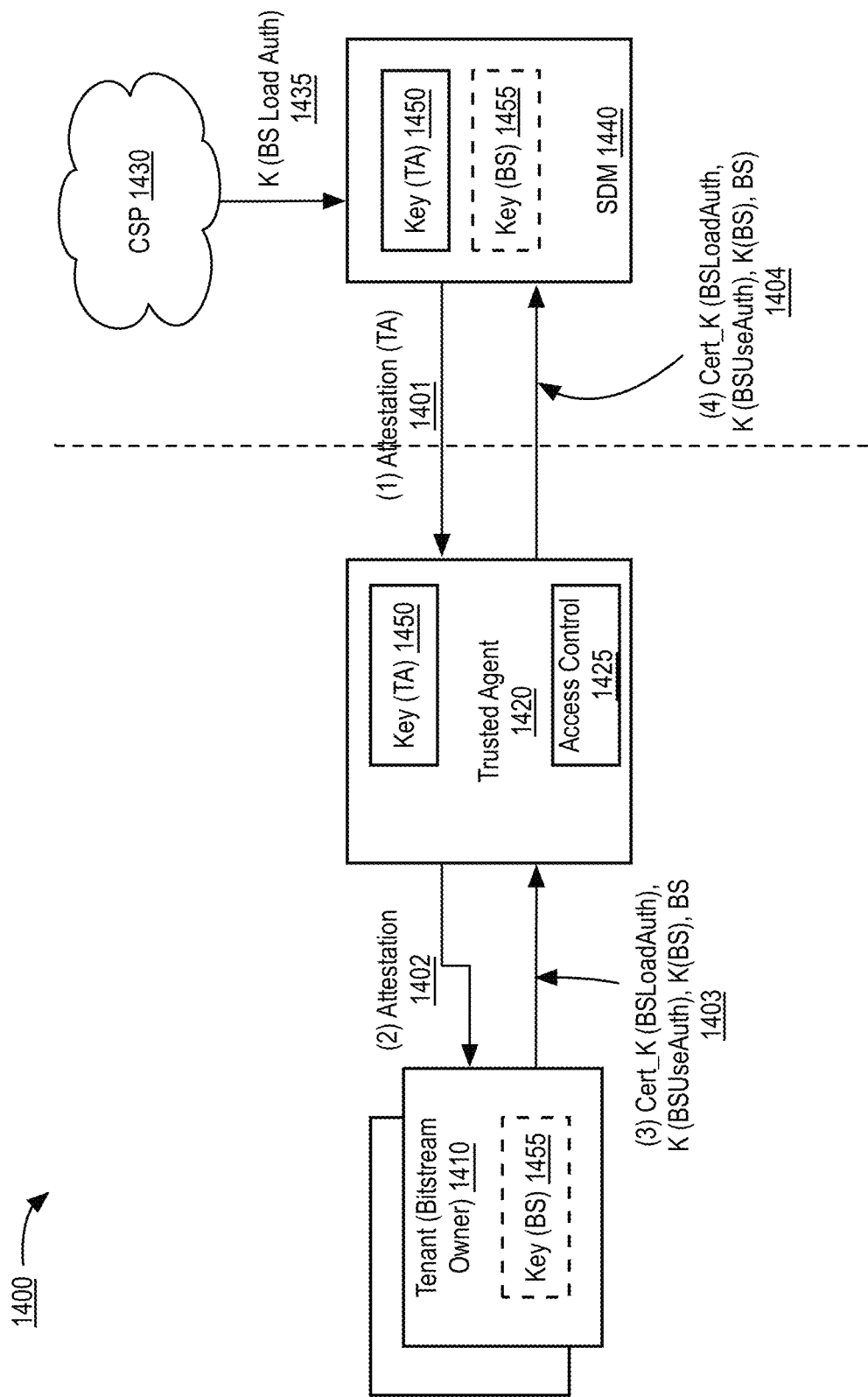
FIG. 14 illustrates a network environment providing secure communication via attestation and key exchange of multi-tenant configurations on accelerator devices, in accordance with implementations of the disclosure.

FIG. 14 illustrates a network environment 1400 providing secure communication via attestation and key exchange of multi-tenant configurations on accelerator devices, in accordance with implementations of the disclosure. An example key exchange flow between tenant (bitstream owner) 1410, trusted agent 1420, and SDM 1440 of network environment 1400 is shown in FIG. 14. In one implementation, tenant 1410 is the same as tenant 1310 of FIG. 13, TA 1420 is the same as TA 1335 of FIG. 13, and SDM 1440 is the same as SDM 1342 of FIG. 13.

Further details of the keys used in the example key exchange depicted in FIG. 14 is provided below:

$K_{BSLoadAuth}$ 1435
Owned by CSP
Root key for certificates determining which tenant owners can load the bitstream
$K_{BSUseAuth}$ 1403
Owned by Tenant Bitstream Owner
Root key for certificates determining which data owners can use their bitstream
$K_{TA}$ 1450
Used by Trusted Agent and Device
Symmetric session Key established as part of Attestation
$K_{BS}$ 1455
Used by Tenant Bitstream Owner and Device
Symmetric session Key established as part of Attestation As shown in network environment 1400, the SDM 1440 is provisioned with a root key 1435 owned by the CSP 1430. The root key 1435 is used for certificates determining which Tenant Owners can load a tenant bitstream. The SDM 1432 then performs attestation 1401 with the TA to establish a symmetric session key (K (TA) 1450) between the TA 1450 and SDM 1432. The TA 1420 can perform attestation 1402 with the tenant 1410 to establish a symmetric session key (K (BS) 1455) between the tenant 1410 and the TA 1450.

The tenant provides 1403, to the TA 1420, the tenant bitstream, along with a certificate and the keys: K (BSUseAuth) 1403 and K (BS) 1455. In one implementation, the certificate is signed using the K (BSLoadAuth) 1435, which is the root key (owned by the CSP) for certificates determining which tenant owners can load the tenant's bitstream.

The TA 1420 uses access control logic 1425 to determine whether the tenant 1410 is authorized to load their tenant bitstream to the FPGA. If authorized, the TA 1420 provides 1404, to the SDM 1440, the tenant bitstream, along with a certificate and the keys: K (BSUseAuth) 1403 and K (BS) 1455. In one implementation, the certificate is signed using the K (BSLoadAuth) 1435, which is the root key (owned by the CSP) for certificates determining which tenant owners can load the tenant's bitstream.

Figure 15:
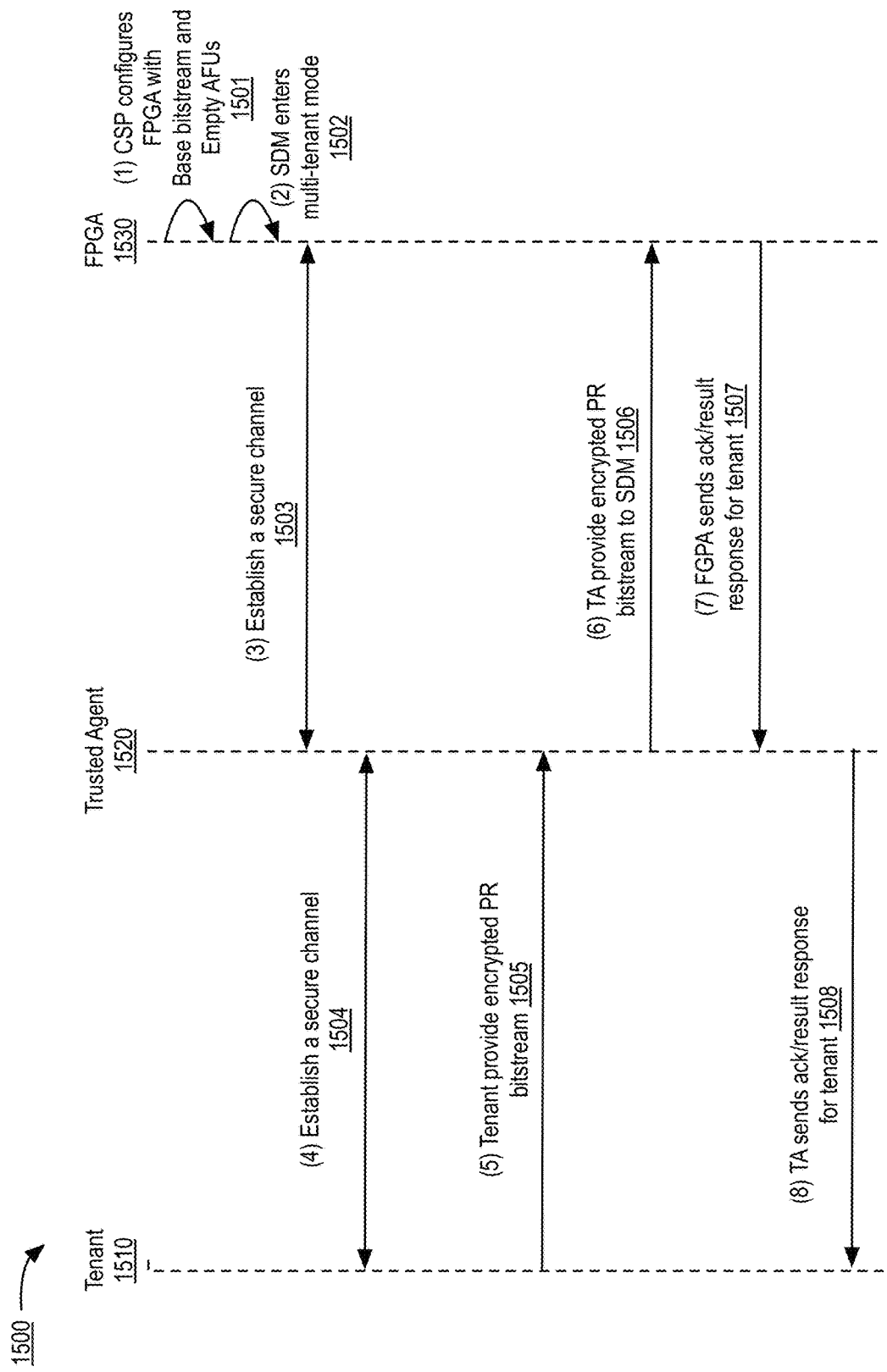
FIG. 15 illustrates an example multi-tenant attestation flow, in accordance with implementations of the disclosure.

FIG. 15 illustrates an example multi-tenant attestation flow 1500, in accordance with implementations of the disclosure. The example multi-tenant attestation flow 1500 includes communications between a tenant 1510, a trusted agent 1520 on a CSP's host, and an FPGA 1530. In one implementation, tenant 1510 is the same as tenant 1310 of FIG. 13, TA 1520 is the same as TA 1335 of FIG. 13, and FPGA 1530 is the same as SDM 1340 of FIG. 13. The example multi-attestation flow 1500 is further detailed in the below description.

In one implementation, prior to performing the example multi-attestation flow 1500, the tenant 1510 generates a symmetric key to be shared with the TA 1520 for encrypting PR bitstreams for a given multi-tenant configuration. At a first step 1501, the CSP configures the FPGA 1530 with a base bitstream and empty accelerator functional units (AFUs). At a second step 1502, the SDM (of the FPGA 1530) enters a multi-tenant mode. As part of the multi-tenant mode, the SDM maintains one shared secret with the TA 1520 and maintains attestation evidence for the FPGA 1530.

At a third step 1530, a secure channel is established between the TA 1520 and the FPGA 1530. In one implementation, the TA 1520 maintains a shared secret key per tenant. At a fourth step 1504, a secure channel is established between the TA 1520 and the tenant 1510. The tenant 1510 inspects the FPGA attestation from the TA 1520. In one implementation, the tenant 1510 hash checks for case bitstream and mask.

At a fifth step 1505, the tenant 1510 provides an encrypted PR bitstream 1505 to the TA 1520. Once the encrypted bitstream is received, the TA 1520 verifies that the tenant 1510 and verifies the hash of the base bitstream and PR mask. In some implementations, the TA 1520 also decrypts the PR bitstream and re-encrypts it with the SDM shared key. The TA 1520 may perform additional access-control enforcements as well.

At a sixth step 1506, the TA 1520 provides the encrypted PR bitstream to the SDM of the FPGA 1530. The SDM may then enforce the PR-mask check on the tenant PR bitstream. At a seventh step 1507, the FPGA 1530 sends an acknowledgement and result response to for the tenant to the TA 1520. At an eight (and final) step 1508, the TA 1520 send the acknowledgement and result to the tenant 1510.

Another detailed example multi-tenant attestation flow with a TA on a CSP host is further described below, in accordance with implementations of the disclosure:

1. The CSP decides multi-tenant configuration conditions for the FPGA based on usage. The multi-tenant configuration conditions may include, but are not limited to, PR sector sizes, number of concurrent tenants, configuration (debug . . . etc.), and so on.
2. The CSP generates a base bitstream with PR Grid Boundaries using circuit design tool. Enable circuit design tool reserved for routing feature for the PR boundary. Generate PR Mask for the support configuration.
3. CSP publishes the Static PR Config Grid boundaries for Tenant Users. PR Grid Configuration. Publish the base bitstream. CSP does not have C/I requirements on base bitstream logic. Hash of the PR-Mask. Hash of base bitstream ID.
4. Trusted Agent on the CSP's host platform attests the Device. SDM provides Device Attestation info to the CSP (could send to remote tenant based on the usage model); Immutable Device ID; CMF FW; LSM FW-Open (measured at boot); Different FW images for different functions; Tenant can embed a FW image with the BS); Base bitstream ID; Hash of the PR-Mask; SDM Mode (e.g., secure or debug).
5. SDM locks Platform configuration until FPGA reboot. Enters Secure SDM Mode. FIM updates with different base bitstream ID are not allowed.
6. Tenants generate PR bitstreams to fit within one or more PR Grids published by the CSP using circuit design tool.

7. Tenants get Device attestation info from Trusted Agent. Tenant verifies the base bitstream ID and Hash of the PR Mask.
8. Tenants provide the PR bitstreams to the CSP. CSP does a PR reconfiguration on the FPGA using circuit design tool.
9. SDM authorizes PR request: Verifies the Tenant is an authorized CSP customer to load its Bitstream on the FPGA. Verifies the Tenant PR bitstream was generated for the configured Base Bitstream on the FPGA. (Hash of the base bitstream ID). Enforces the PR-Mask check on the Tenant PR bitstream.
10. LSM gets the Tenant PR bitstream from the SDM. LSM can disable any firmware embedded in the Tenant PR. LSM runs the tenant PR bitstream against security enforcement policies as part of the isolation contract (e.g., peek/poke mask checks, contention, etc.).

Implementations of the disclosure also address attesting and connecting to individual personas (e.g., workloads) inside the FPGA. Prior conventional protocols focused on attestation of the target platform for provisioning. Once provisioned, implementations of the disclosure provide for securing I/O with a target persona, using long-lived, high-bandwidth secure channels.

Figure 16:
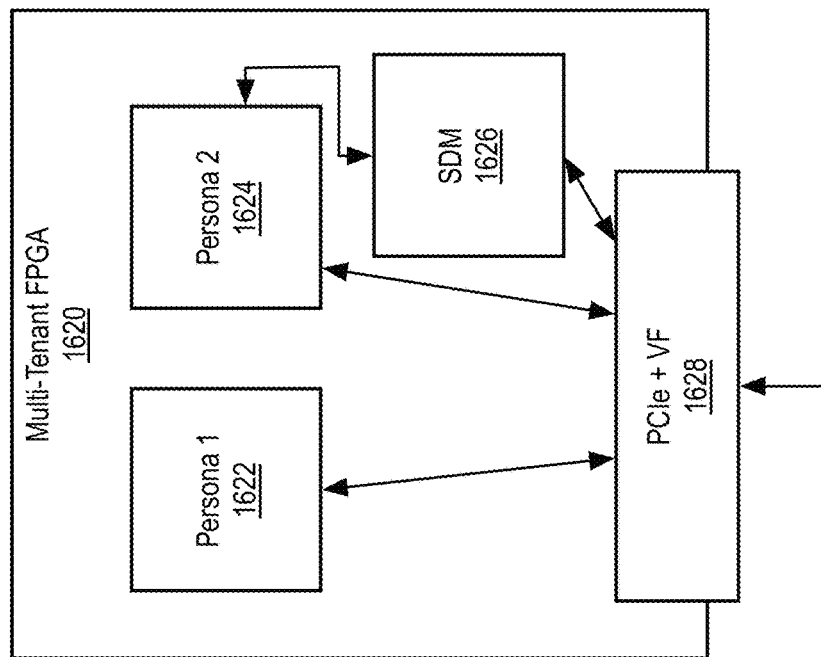
FIG. 16 illustrates a network environment providing an example scheme for delegating secure I/O to a virtual function (VF) block, in accordance with implementations of the disclosure.
Figure 16:
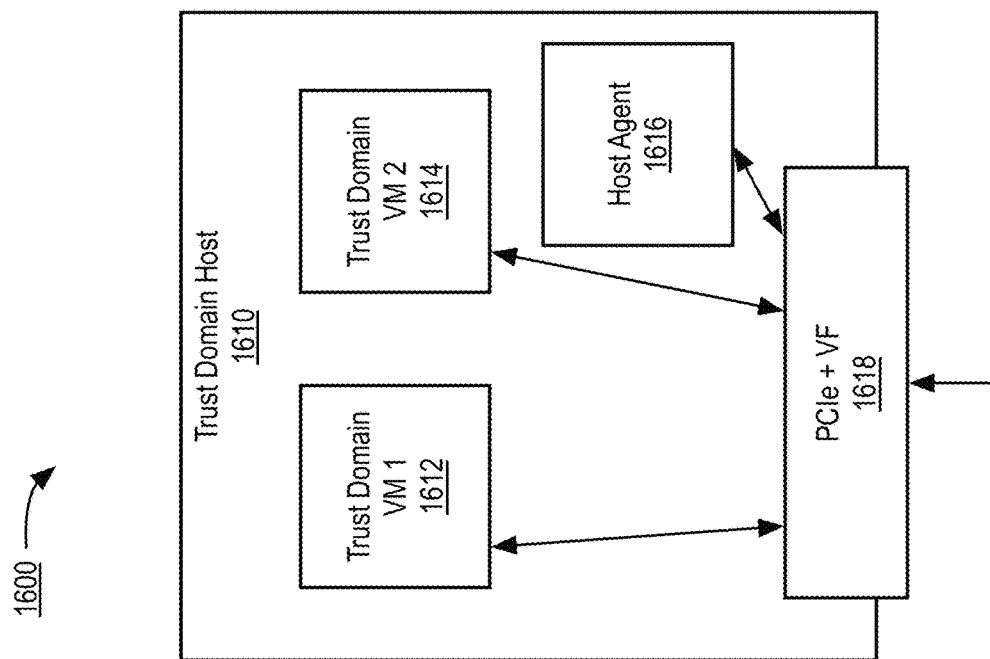

FIG. 16 illustrates a network environment 1600 providing an example scheme for delegating secure I/O to a virtual function (VF) block, in accordance with implementations of the disclosure. Network environment 1600 include a trust domain (TD) host 1610 communicably coupled (e.g., via a network (not shown)) to a multi-tenant FPGA 1620. In one implementation, FPGA 1620 is the same as FPGA 10 described above with respect to FIGS. 1-7.

The trust domain host 1610 may provide for hardware-isolated VMs 1612, 1614, called trust domains. The VMs 1612, 1614 are isolated from the VMM/hypervisor and any other non-TD software on TD host 1610. In one implementation, the TD VMs 1612, 1614 may offload workload to the multi-tenant FPGA 1620 for acceleration of the workloads. The FPGA 1620 may configure multiple personas 1622, 1624 to accelerating the workloads of the TD VMs 1612, 1614.

Implementations of the disclosure may apply the above-described multi-tenant attestation flow, such as flow 1500 described with respect to FIG. 15, to delegate secure I/O to a peripheral component interconnect (PCI) VF 1618 of the trust domain host 1610 and a PCI VF 1628 of the multi-tenant FPGA 1620. The multi-tenant attestation flow may utilize host agent 1616 and SDM 1626 to perform the attestation flow in accordance with the description above. The secure I/O may be utilized for communication of the workloads of the TD VMs 1612, 1614 to their corresponding personas 1622, 1624 configured on multi-tenant FPGA 1620.

Benefits of attesting and connecting to individual personas includes side-stepping SDM, which reduces the firmware load and allows for better throughput scaling. Furthermore, benefits include providing a separate customer-visible interface from the underlying provisioning protocol, which is highly dependent on the target platform.

FIG. 17 is a flow diagram illustrating a method 1700 for enabling secure communication via attestation of multi-tenant configuration on accelerator devices, in accordance with implementations of the disclosure. Method 1700 may be performed by processing logic that may comprise hardware (e.g., circuitry, dedicated logic, programmable logic, etc.), software (such as instructions run on a processing device), or a combination thereof. More particularly, the method 1700 may be implemented in one or more modules as a set of logic instructions stored in a machine- or computer-readable storage medium such as RAM, ROM, PROM, firmware, flash memory, etc., in configurable logic such as, for example, programmable logic arrays (PLAs), field-programmable gate arrays (FPGAs), complex programmable logic devices (CPLDs), in fixed-functionality logic hardware using circuit technology such as, for example, application-specific integrated circuit (ASIC), complementary metal oxide semiconductor (CMOS) or transistor-transistor logic (TTL) technology, or any combination thereof.

The process of method 1700 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 10-16 may not be repeated or discussed hereafter. In one implementation, a processor, such as a processor of a tenant (including tenants 1102, 1104, 1220, 1310, 1410, 1510 described with respect to FIGS. 11-15, may perform method 1700.

Method 1700 begins at block 1710 where the processor may verify a base bitstream of an accelerator device, the base bitstream published by a CSP. At block 1720, the processor may verify partial reconfiguration (PR) boundary setups and PR isolation of an accelerator device, the PR boundary setups and PR isolation published by the CSP.

Subsequently, at block 1730, the processor may generate PR bitstream to fit within at least one PR region of the PR boundary setups of the accelerator device. At block 1740, the processor may inspect accelerator device attestation received from a secure device manager (SDM) of the accelerator device. Lastly, at block 1750, the processor may, responsive to successful inspection of the accelerator device attestation, provide the PR bitstream to the CSP for PR reconfiguration of the accelerator device.

Flowcharts representative of example hardware logic, machine readable instructions, hardware implemented state machines, and/or any combination thereof for implementing the systems, already discussed. The machine readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the whole program and/or parts thereof could alternatively be executed by a device other than the processor and/or embodied in firmware or dedicated hardware. Further, although the example program is described with reference to the flowcharts illustrated in the various figures herein, many other methods of implementing the example computing system may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus to facilitate enabling secure communication via attestation of multi-tenant configuration on accelerator devices. The apparatus of Example 1 comprises a processor to: verify a base bitstream of an accelerator device, the base bitstream published by a cloud service provider (CSP); verify partial reconfiguration (PR) boundary setups and PR isolation of an accelerator device, the PR boundary setups and PR isolation published by the CSP; generate PR bitstream to fit within at least one PR region of the PR boundary setups of the accelerator device; inspect accelerator device attestation received from a secure device manager (SDM) of the accelerator device; and responsive to successful inspection of the accelerator device attestation, provide the PR bitstream to the CSP for PR reconfiguration of the accelerator device.

In Example 2, the subject matter of Example 1 can optionally include wherein the SDM comprises a configuration manager and security enclave for the accelerator device. In Example 3, the subject matter of any one of Examples 1-2 can optionally include wherein a circuit design tool is utilized to inspect and verify the base bitstream, the PR boundary setups, and the PR isolation. In Example 4, the subject matter of any one of Examples 1-3 can optionally include wherein the circuit design tool is utilized to generate the PR bitstream.

In Example 5, the subject matter of any one of Examples 1-4 can optionally include wherein a trusted agent of the CSP provides the accelerator device attestation. In Example 6, the subject matter of any one of Examples 1-5 can optionally include wherein the SDM provides the accelerator device attestation to the trusted agent. In Example 7, the subject matter of any one of Examples 1-6 can optionally include wherein the accelerator device attestation comprises an immutable accelerator device identifier (ID), a base bitstream ID, and a hash of a PR mask.

In Example 8, the subject matter of any one of Examples 1-7 can optionally include wherein the accelerator device comprises at least one a graphic processing unit (GPU), a central processing unit (CPU), or a programmable integrated circuit (IC). In Example 9, the subject matter of any one of Examples 1-8 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 10 is a method for facilitating enabling secure communication via attestation of multi-tenant configuration on accelerator devices. The method of Example 10 can include verifying, by one or more processors, a base bitstream of an accelerator device, the base bitstream published by a cloud service provider (CSP); verifying partial reconfiguration (PR) boundary setups and PR isolation of an accelerator device, the PR boundary setups and PR isolation published by the CSP; generating PR bitstream to fit within at least one PR region of the PR boundary setups of the accelerator device; inspecting accelerator device attestation received from a secure device manager (SDM) of the accelerator device; and responsive to successful inspection of the accelerator device attestation, providing the PR bitstream to the CSP for PR reconfiguration of the accelerator device.

In Example 11, the subject matter of Example 10 can optionally include wherein a circuit design tool is utilized to inspect and verify the base bitstream, the PR boundary setups, and the PR isolation. In Example 12, the subject matter of any one of Examples 10-11 can optionally include wherein the circuit design tool is utilized to generate the PR bitstream. In Example 13, the subject matter of any one of Examples 10-12 can optionally include wherein a trusted agent of the CSP provides the accelerator device attestation, and wherein the SDM provides the accelerator device attestation to the trusted agent.

In Example 14, the subject matter of any one of Examples 10-13 can optionally include wherein the accelerator device attestation comprises an immutable accelerator device identifier (ID), a base bitstream ID, and a hash of a PR mask. In Example 15, the subject matter of any one of Examples 10-14 can optionally include wherein the accelerator device comprises at least one a graphic processing unit (GPU), a central processing unit (CPU), or a programmable integrated circuit (IC), and wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 16 is a non-transitory machine readable storage medium for facilitating enabling secure communication via attestation of multi-tenant configuration on accelerator devices. The non-transitory computer-readable storage medium of Example 16 having stored thereon executable computer program instructions that, when executed by one or more processors, cause the one or more processors to perform operations comprising: verify, by the at least one processor, a base bitstream of an accelerator device, the base bitstream published by a cloud service provider (CSP); verify partial reconfiguration (PR) boundary setups and PR isolation of an accelerator device, the PR boundary setups and PR isolation published by the CSP; generate PR bitstream to fit within at least one PR region of the PR boundary setups of the accelerator device; inspect accelerator device attestation received from a secure device manager (SDM) of the accelerator device; and responsive to successful inspection of the accelerator device attestation, provide the PR bitstream to the CSP for PR reconfiguration of the accelerator device.

In Example 17, the subject matter of Example 16 can optionally include wherein a circuit design tool is utilized to inspect and verify the base bitstream, the PR boundary setups, and the PR isolation. In Example 18, the subject matter of Examples 16-17 can optionally include wherein the circuit design tool is utilized to generate the PR bitstream. In Example 19, the subject matter of Examples 16-18 can optionally include wherein a trusted agent of the CSP provides the accelerator device attestation, and wherein the SDM provides the accelerator device attestation to the trusted agent. In Example 20, the subject matter of Examples 16-19 can optionally include wherein the accelerator device attestation comprises an immutable accelerator device identifier (ID), a base bitstream ID, and a hash of a PR mask.

Example 21 is a system for facilitating enabling secure communication via attestation of multi-tenant configuration on accelerator devices. The system of Example 21 can optionally include a memory, and a processor communicably coupled to the memory. The processor of the system of Example 21 can be configured to verify a base bitstream of an accelerator device, the base bitstream published by a cloud service provider (CSP); verify partial reconfiguration (PR) boundary setups and PR isolation of an accelerator device, the PR boundary setups and PR isolation published by the CSP; generate PR bitstream to fit within at least one PR region of the PR boundary setups of the accelerator device; inspect accelerator device attestation received from a secure device manager (SDM) of the accelerator device; and responsive to successful inspection of the accelerator device attestation, provide the PR bitstream to the CSP for PR reconfiguration of the accelerator device.

In Example 22, the subject matter of Example 21 can optionally include wherein the SDM comprises a configuration manager and security enclave for the accelerator device. In Example 23, the subject matter of any one of Examples 21-22 can optionally include wherein a circuit design tool is utilized to inspect and verify the base bitstream, the PR boundary setups, and the PR isolation. In Example 24, the subject matter of any one of Examples 21-23 can optionally include wherein the circuit design tool is utilized to generate the PR bitstream.

In Example 25, the subject matter of any one of Examples 21-24 can optionally include wherein a trusted agent of the CSP provides the accelerator device attestation. In Example 26, the subject matter of any one of Examples 21-25 can optionally include wherein the SDM provides the accelerator device attestation to the trusted agent. In Example 27, the subject matter of any one of Examples 21-26 can optionally include wherein the accelerator device attestation comprises an immutable accelerator device identifier (ID), a base bitstream ID, and a hash of a PR mask.

In Example 28, the subject matter of any one of Examples 21-27 can optionally include wherein the accelerator device comprises at least one a graphic processing unit (GPU), a central processing unit (CPU), or a programmable integrated circuit (IC). In Example 29, the subject matter of any one of Examples 21-28 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 30 is an apparatus for facilitating enabling secure communication via attestation of multi-tenant configuration on accelerator devices according to implementations of the disclosure. The apparatus of Example 30 can comprise means for verifying a base bitstream of an accelerator device, the base bitstream published by a cloud service provider (CSP); means for verifying partial reconfiguration (PR) boundary setups and PR isolation of an accelerator device, the PR boundary setups and PR isolation published by the CSP; means for generating PR bitstream to fit within at least one PR region of the PR boundary setups of the accelerator device; means for inspecting accelerator device attestation received from a secure device manager (SDM) of the accelerator device; and responsive to successful inspection of the accelerator device attestation, means for providing the PR bitstream to the CSP for PR reconfiguration of the accelerator device.

In Example 31, the subject matter of Example 30 can optionally include the apparatus further configured to perform the method of any one of the Examples 11 to 15.

Example 32 is at least one machine readable medium comprising a plurality of instructions that in response to being executed on a computing device, cause the computing device to carry out a method according to any one of Examples 10-15. Example 33 is an apparatus for facilitating enabling secure communication via attestation of multi-tenant configuration on accelerator devices, configured to perform the method of any one of Examples 10-15. Example 34 is an apparatus for facilitating enabling secure communication via attestation of multi-tenant configuration on accelerator devices comprising means for performing the method of any one of claims 10 to 15. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:
1. An apparatus comprising:
a processor to:
verify a base bitstream of an accelerator device, the base bitstream published by a cloud service provider (CSP);
verify partial reconfiguration (PR) boundary setups and PR isolation of an accelerator device, the PR boundary setups and PR isolation published by the CSP;
generate PR bitstream to fit within at least one PR region of the PR boundary setups of the accelerator device;
inspect accelerator device attestation received from a secure device manager (SDM) of the accelerator device; and
responsive to successful inspection of the accelerator device attestation, provide the PR bitstream to the CSP for PR reconfiguration of the accelerator device.

2. The apparatus of claim 1, wherein the SDM comprises a configuration manager and security enclave for the accelerator device.

3. The apparatus of claim 1, wherein a circuit design tool is utilized to inspect and verify the base bitstream, the PR boundary setups, and the PR isolation.

4. The apparatus of claim 3, wherein the circuit design tool is utilized to generate the PR bitstream.

5. The apparatus of claim 1, wherein a trusted agent of the CSP provides the accelerator device attestation.

6. The apparatus of claim 5, wherein the SDM provides the accelerator device attestation to the trusted agent.

7. The apparatus of claim 1, wherein the accelerator device attestation comprises an immutable accelerator device identifier (ID), a base bitstream ID, and a hash of a PR mask.

8. The apparatus of claim 1, wherein the accelerator device comprises at least one a graphic processing unit (GPU), a central processing unit (CPU), or a programmable integrated circuit (IC).

9. The apparatus of claim 8, wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

10. A method comprising:
verifying, by one or more processors, a base bitstream of an accelerator device, the base bitstream published by a cloud service provider (CSP);
verifying partial reconfiguration (PR) boundary setups and PR isolation of an accelerator device, the PR boundary setups and PR isolation published by the CSP;
generating PR bitstream to fit within at least one PR region of the PR boundary setups of the accelerator device;
inspecting accelerator device attestation received from a secure device manager (SDM) of the accelerator device; and
responsive to successful inspection of the accelerator device attestation, providing the PR bitstream to the CSP for PR reconfiguration of the accelerator device.

11. The method of claim 10, wherein a circuit design tool is utilized to inspect and verify the base bitstream, the PR boundary setups, and the PR isolation.

12. The method of claim 11, wherein the circuit design tool is utilized to generate the PR bitstream.

13. The method of claim 10, wherein a trusted agent of the CSP provides the accelerator device attestation, and wherein the SDM provides the accelerator device attestation to the trusted agent.

14. The method of claim 10, wherein the accelerator device attestation comprises an immutable accelerator device identifier (ID), a base bitstream ID, and a hash of a PR mask.

15. The method of claim 10, wherein the accelerator device comprises at least one a graphic processing unit (GPU), a central processing unit (CPU), or a programmable integrated circuit (IC), and wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

16. A non-transitory machine readable storage medium comprising instructions that, when executed, cause at least one processor to at least:
    verify, by the at least one processor, a base bitstream of an accelerator device, the base bitstream published by a cloud service provider (CSP);
    verify partial reconfiguration (PR) boundary setups and PR isolation of an accelerator device, the PR boundary setups and PR isolation published by the CSP;
    generate PR bitstream to fit within at least one PR region of the PR boundary setups of the accelerator device;
    inspect accelerator device attestation received from a secure device manager (SDM) of the accelerator device; and
    responsive to successful inspection of the accelerator device attestation, provide the PR bitstream to the CSP for PR reconfiguration of the accelerator device.

17. The non-transitory machine readable storage medium of claim 16, wherein a circuit design tool is utilized to inspect and verify the base bitstream, the PR boundary setups, and the PR isolation.

18. The non-transitory machine readable storage medium of claim 17, wherein the circuit design tool is utilized to generate the PR bitstream.

19. The non-transitory machine readable storage medium of claim 16, wherein a trusted agent of the CSP provides the accelerator device attestation, and wherein the SDM provides the accelerator device attestation to the trusted agent.

20. The non-transitory machine readable storage medium of claim 16, wherein the accelerator device attestation comprises an immutable accelerator device identifier (ID), a base bitstream ID, and a hash of a PR mask.

\* \* \* \* \*